US010181740B2

(12) United States Patent
Tanaka et al.

(10) Patent No.: US 10,181,740 B2
(45) Date of Patent: Jan. 15, 2019

(54) CHARGING CONTROL APPARATUS, BATTERY, ELECTRONIC DEVICE, VEHICLE, CHARGING CONTROL METHOD, AN ELECTRIC STORAGE SYSTEM AND CHARGING CONTROL UNIT

(71) Applicant: Murata Manufacturing Co., Ltd., Kyoto (JP)

(72) Inventors: Masatomo Tanaka, Kanagawa (JP); Yoshifumi Shimizu, Kanagawa (JP); Akira Ichihashi, Kanagawa (JP); Akira Yamaguchi, Kanagawa (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 144 days.

(21) Appl. No.: 14/618,040

(22) Filed: Feb. 10, 2015

(65) Prior Publication Data

US 2015/0236529 A1    Aug. 20, 2015

(30) Foreign Application Priority Data

Feb. 14, 2014   (JP) ................. 2014-026307

(51) Int. Cl.
*H02J 7/00* (2006.01)
*B60L 11/18* (2006.01)
(Continued)

(52) U.S. Cl.
CPC ............ *H02J 7/007* (2013.01); *B60L 11/007* (2013.01); *B60L 11/126* (2013.01);
(Continued)

(58) Field of Classification Search
CPC ..... H02J 7/007; B60L 11/007; B60L 11/1803; B60L 11/1805; B60L 11/1816; B60L 11/184; B60L 11/1842; B60L 11/1844; B60L 11/1846; B60L 11/1861; B60L 11/1864; B60L 15/20; B60L 15/2009
(Continued)

(56) References Cited

U.S. PATENT DOCUMENTS 3,576,487 A * 4/1971 Chase ................... H02J 7/0086
320/139
3,816,806 A * 6/1974 Mas ...................... H02J 7/0093
320/129
(Continued)

FOREIGN PATENT DOCUMENTS

| CN | 101252212 | 8/2008 |
| CN | 101855773 | 10/2010 |

(Continued)

OTHER PUBLICATIONS

Extended Search Report dated Jul. 15, 2015, for corresponding European Appln. No. 15153738.8 (8 pages).

*Primary Examiner* — Robert Grant
*Assistant Examiner* — John Trischler
(74) *Attorney, Agent, or Firm* — K&L Gates LLP

(57) ABSTRACT

A charging control apparatus is provided and includes a control unit configured to transmit instructions to a charging unit to execute charging of a battery. The control unit is configured to cause a scheme change from a first charging scheme to a second charging scheme based on charging scheme information received by the control unit.

24 Claims, 11 Drawing Sheets

(51) Int. Cl.
*B60L 11/00* (2006.01)
*B60L 11/12* (2006.01)
*B60L 15/20* (2006.01)

(52) U.S. Cl.
CPC ......... *B60L 11/1803* (2013.01); *B60L 11/184* (2013.01); *B60L 11/1805* (2013.01); *B60L 11/1809* (2013.01); *B60L 11/1816* (2013.01); *B60L 11/1842* (2013.01); *B60L 11/1844* (2013.01); *B60L 11/1846* (2013.01); *B60L 11/1861* (2013.01); *B60L 11/1864* (2013.01); *B60L 15/20* (2013.01); *B60L 15/2009* (2013.01); *H02J 7/0004* (2013.01); *H02J 7/0077* (2013.01); *B60L 2200/12* (2013.01); *B60L 2210/30* (2013.01); *B60L 2210/40* (2013.01); *B60L 2230/30* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01); *B60L 2240/549* (2013.01); *B60L 2240/80* (2013.01); *B60L 2250/16* (2013.01); *B60L 2270/145* (2013.01); *Y02E 60/721* (2013.01); *Y02T 10/6217* (2013.01); *Y02T 10/645* (2013.01); *Y02T 10/7011* (2013.01); *Y02T 10/7044* (2013.01); *Y02T 10/7061* (2013.01); *Y02T 10/7077* (2013.01); *Y02T 10/7088* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC .................................................. 320/107, 109
See application file for complete search history.

(56) References Cited

U.S. PATENT DOCUMENTS

| | | | | |
|---|---|---|---|---|
| 4,035,709 A | * | 7/1977 | Seider | H02J 7/008 320/158 |
| 4,079,303 A | * | 3/1978 | Cox | H02J 7/0018 320/119 |
| 4,163,934 A | * | 8/1979 | Lawn | H02J 7/0081 320/160 |
| 4,536,697 A | * | 8/1985 | Johnston | H02J 7/1446 180/282 |
| 4,710,694 A | * | 12/1987 | Sutphin | H02J 7/0073 320/139 |
| 4,885,523 A | * | 12/1989 | Koenck | G01R 31/3655 320/131 |
| 5,077,151 A | * | 12/1991 | Yasuda | H01M 4/26 429/206 |
| 5,179,335 A | * | 1/1993 | Nor | H02J 7/0085 320/159 |
| 5,192,905 A | * | 3/1993 | Karlin | H02J 7/022 320/145 |
| 5,204,611 A | * | 4/1993 | Nor | H02J 7/0086 320/145 |
| 5,408,170 A | * | 4/1995 | Umetsu | H02J 7/0086 320/148 |
| 5,541,491 A | * | 7/1996 | Yamazaki | H02J 7/0091 320/145 |
| 5,545,969 A | * | 8/1996 | Hasegawa | G01R 31/3624 320/134 |
| 5,602,460 A | * | 2/1997 | Fernandez | H02J 7/0031 320/152 |
| 5,646,504 A | * | 7/1997 | Feldstein | H02J 7/0018 320/119 |
| 5,686,815 A | * | 11/1997 | Reipur | G01R 31/3613 320/116 |
| 5,994,878 A | * | 11/1999 | Ostergaard | H02J 7/0004 320/132 |
| 6,066,939 A | * | 5/2000 | Nagai | H02J 7/0036 320/127 |
| 6,075,339 A | * | 6/2000 | Reipur | H01M 10/4257 320/110 |
| 6,124,700 A | * | 9/2000 | Nagai | H02J 7/0052 320/130 |
| 6,236,215 B1 | * | 5/2001 | Kanehira | G01R 31/3658 320/118 |
| 6,239,508 B1 | * | 5/2001 | Faris | H01M 6/5011 307/10.1 |
| 6,388,427 B1 | * | 5/2002 | Levine | H02J 7/0091 320/151 |
| 6,456,042 B1 | * | 9/2002 | Kwok | H02J 7/0029 320/128 |
| 6,563,290 B2 | * | 5/2003 | Sakakibara | H02J 7/0045 320/106 |
| 6,661,203 B2 | * | 12/2003 | Wolin | H02J 7/0091 320/128 |
| 6,741,065 B1 | * | 5/2004 | Ishii | B60L 11/1816 320/122 |
| 6,841,973 B2 | * | 1/2005 | Bernardon | H02J 7/00 320/139 |
| 6,972,545 B2 | * | 12/2005 | Tsuchiya | H01M 10/44 320/132 |
| 7,227,333 B2 | * | 6/2007 | Yamada | H01M 10/48 320/106 |
| 7,330,013 B2 | * | 2/2008 | Wolin | H02J 7/0091 320/150 |
| 7,518,340 B2 | * | 4/2009 | Sterz | H02J 7/0068 320/131 |
| 7,570,021 B2 | * | 8/2009 | Togashi | B60K 6/445 320/130 |
| 7,583,058 B2 | * | 9/2009 | Iijima | H01M 4/505 320/107 |
| 7,671,559 B2 | * | 3/2010 | Ludtke | H02J 7/0004 320/106 |
| 8,111,038 B2 | * | 2/2012 | Wang | B60L 11/1816 180/165 |
| 8,143,863 B2 | * | 3/2012 | Li | H02J 7/0073 320/141 |
| 8,163,410 B2 | * | 4/2012 | Fulop | H01M 2/30 429/163 |
| 8,183,832 B2 | * | 5/2012 | Otsu | H01M 10/052 320/116 |
| 8,193,778 B2 | * | 6/2012 | Morina | H02J 7/0013 320/116 |
| 8,269,453 B2 | * | 9/2012 | Ludtke | H02J 7/0004 320/106 |
| 8,305,045 B2 | * | 11/2012 | Maeagawa | H02J 7/008 320/139 |
| 8,330,415 B2 | * | 12/2012 | Sato | B60L 3/12 180/65.29 |
| 8,373,419 B2 | * | 2/2013 | Ugaji | G01R 31/3679 320/107 |
| 8,405,361 B2 | * | 3/2013 | Richards | H02J 7/0055 320/132 |
| 8,436,588 B2 | * | 5/2013 | Morina | H02J 7/0013 320/116 |
| 8,541,122 B2 | * | 9/2013 | Fulop | H01M 2/30 429/163 |
| 8,581,554 B2 | * | 11/2013 | Saligram | H02J 7/0078 320/132 |
| 8,604,755 B2 | * | 12/2013 | Nishimura | H01M 4/587 320/132 |
| 8,643,342 B2 | * | 2/2014 | Mehta | H02J 7/0073 320/160 |
| 8,704,489 B2 | * | 4/2014 | Hamaguchi | H01M 10/0525 320/134 |
| 8,754,614 B2 | * | 6/2014 | Paryani | H01M 10/0525 320/160 |

(56) References Cited

U.S. PATENT DOCUMENTS

| | | | | |
|---|---|---|---|---|
| 8,773,069 B2* | 7/2014 | Tanno | H01M 10/44 | 320/116 |
| 8,786,253 B2* | 7/2014 | Ohtomo | B60L 3/003 | 320/104 |
| 8,796,996 B2* | 8/2014 | Nakatsuji | H01M 2/34 | 320/134 |
| 8,803,482 B2* | 8/2014 | Ueki | H01M 10/0525 | 320/134 |
| 8,810,203 B2* | 8/2014 | Abe | H01M 10/3909 | 320/132 |
| 8,816,648 B2* | 8/2014 | Bhardwaj | H02J 7/0073 | 320/152 |
| 8,860,368 B2* | 10/2014 | Ohtomo | B60L 3/0069 | 320/104 |
| 8,884,579 B2* | 11/2014 | Hondo | H02J 3/32 | 320/101 |
| 8,963,504 B2* | 2/2015 | Kuroda | H01M 10/44 | 320/137 |
| 8,970,182 B2* | 3/2015 | Paryani | H01M 10/0525 | 320/107 |
| 8,981,717 B2* | 3/2015 | Hayashi | B60L 3/12 | 180/65.1 |
| 9,018,916 B2* | 4/2015 | Iriyama | H01M 4/485 | 320/132 |
| 9,071,072 B2* | 6/2015 | Tamezane | H02J 7/0077 | 320/104 |
| 9,178,380 B2* | 11/2015 | Kawai | H02J 7/045 | |
| 9,190,864 B2* | 11/2015 | Ogihara | H01M 4/505 | |
| 9,315,112 B2* | 4/2016 | Sugiyama | B60L 1/00 | |
| 9,366,731 B2* | 6/2016 | Sakai | G01R 31/3662 | |
| 9,651,628 B2* | 5/2017 | Mattisson | G01R 31/361 | |
| 9,685,799 B2* | 6/2017 | Kaji | H02J 3/24 | |
| 9,698,451 B2* | 7/2017 | Bhardwaj | H01M 10/425 | |
| 9,728,992 B2* | 8/2017 | Takahashi | H01M 10/482 | |
| 9,742,211 B2* | 8/2017 | Stevens | H01M 10/44 | |
| 9,768,476 B2* | 9/2017 | Iriyama | H01M 10/48 | |
| 9,787,119 B2* | 10/2017 | Yamauchi | H02J 7/007 | |
| 9,882,406 B2* | 1/2018 | Satou | H02J 7/007 | |
| 9,906,060 B2* | 2/2018 | Ogihara | B60L 11/1851 | |
| 2001/0001533 A1* | 5/2001 | Stuck Andersen | H01M 10/44 | 320/150 |
| 2002/0000788 A1* | 1/2002 | Ostergaard | H02J 7/0004 | 320/128 |
| 2002/0008523 A1* | 1/2002 | Klang | G01R 31/3631 | 324/429 |
| 2003/0090238 A1* | 5/2003 | Wolin | H02J 7/0091 | 320/150 |
| 2003/0209375 A1* | 11/2003 | Suzuki | B60K 1/04 | 180/65.22 |
| 2004/0135552 A1* | 7/2004 | Wolin | H02J 7/0091 | 320/150 |
| 2004/0212349 A1* | 10/2004 | Tsuchiya | H01M 10/44 | 320/132 |
| 2005/0194934 A1* | 9/2005 | Iijima | H01M 4/505 | 320/128 |
| 2007/0048596 A1* | 3/2007 | Hasegawa | H01M 4/131 | 429/62 |
| 2007/0075686 A1* | 4/2007 | Togashi | B60K 6/445 | 320/130 |
| 2007/0182373 A1* | 8/2007 | Sakakibara | G01R 31/3679 | 320/115 |
| 2008/0197813 A1* | 8/2008 | Asakura | H01M 10/05 | 320/150 |
| 2009/0033277 A1 | 2/2009 | Ludtke | | |
| 2009/0079394 A1* | 3/2009 | Richards | H02J 7/0055 | 320/134 |
| 2009/0103341 A1* | 4/2009 | Lee | H02J 7/022 | 363/124 |
| 2009/0104510 A1* | 4/2009 | Fulop | H01M 2/30 | 429/50 |
| 2010/0076825 A1* | 3/2010 | Sato | B60L 3/12 | 705/14.1 |
| 2010/0085015 A1* | 4/2010 | Hamaguchi | H01M 10/0525 | 320/134 |
| 2010/0102778 A1* | 4/2010 | Otsu | H01M 10/052 | 320/116 |
| 2010/0156184 A1* | 6/2010 | Ludtke | H02J 7/0004 | 307/66 |
| 2011/0006731 A1* | 1/2011 | Wang | B60L 11/1816 | 320/109 |
| 2011/0006737 A1* | 1/2011 | Saligram | H02J 7/0078 | 320/134 |
| 2011/0012563 A1* | 1/2011 | Paryani | H01M 10/0525 | 320/162 |
| 2011/0037438 A1* | 2/2011 | Bhardwaj | H02J 7/0073 | 320/152 |
| 2011/0043040 A1* | 2/2011 | Porter | H02J 7/0024 | 307/66 |
| 2011/0084667 A1* | 4/2011 | Li | H02J 7/0029 | 320/145 |
| 2011/0101919 A1* | 5/2011 | Polk | H01M 10/0525 | 320/118 |
| 2011/0109273 A1* | 5/2011 | Tamezane | H02J 7/0077 | 320/132 |
| 2011/0115440 A1* | 5/2011 | Sabi | H01M 10/44 | 320/145 |
| 2011/0156661 A1* | 6/2011 | Mehta | H02J 7/0073 | 320/160 |
| 2011/0175576 A1* | 7/2011 | Uesaka | H01M 10/44 | 320/155 |
| 2011/0193529 A1* | 8/2011 | Nishimura | H01M 4/587 | 320/134 |
| 2011/0267006 A1* | 11/2011 | Tanno | H01M 10/44 | 320/116 |
| 2011/0267009 A1* | 11/2011 | Nakatsuji | H01M 2/34 | 320/152 |
| 2011/0270477 A1* | 11/2011 | Ueki | H01M 10/0525 | 701/22 |
| 2011/0287324 A1* | 11/2011 | Rajaram | C03C 13/00 | 429/246 |
| 2012/0056591 A1* | 3/2012 | Abe | H01M 10/3909 | 320/132 |
| 2012/0070727 A1* | 3/2012 | Wertz | C03C 4/0035 | 429/188 |
| 2012/0070728 A1* | 3/2012 | Wertz | C08K 7/14 | 429/188 |
| 2012/0070729 A1* | 3/2012 | Wertz | C03C 3/064 | 429/188 |
| 2012/0074909 A1* | 3/2012 | Hondo | H02J 3/32 | 320/128 |
| 2012/0086398 A1* | 4/2012 | Guo | B60L 11/1824 | 320/109 |
| 2012/0086406 A1* | 4/2012 | Maeagawa | H02J 7/008 | 320/162 |
| 2012/0105007 A1* | 5/2012 | Amiruddin | H01M 4/386 | 320/131 |
| 2012/0121975 A1* | 5/2012 | Rajaram | C03C 13/00 | 429/203 |
| 2012/0126744 A1* | 5/2012 | Kuroda | H01M 10/44 | 320/107 |
| 2012/0139475 A1* | 6/2012 | Evans | H02J 7/044 | 320/106 |
| 2012/0223670 A1* | 9/2012 | Kinjo | H02J 3/32 | 320/103 |
| 2012/0249088 A1* | 10/2012 | Abe | B60L 11/1844 | 320/164 |
| 2012/0256588 A1* | 10/2012 | Hayashi | B60L 3/12 | 320/109 |
| 2012/0263986 A1* | 10/2012 | Fulop | H01M 2/30 | 429/91 |
| 2013/0009604 A1* | 1/2013 | Bhardwaj | H01M 10/425 | 320/134 |
| 2013/0063079 A1* | 3/2013 | Kawai | H02J 7/045 | 320/107 |
| 2013/0071723 A1* | 3/2013 | Wertz | H01M 2/0262 | 429/163 |
| 2013/0071734 A1* | 3/2013 | Wertz | H01M 10/08 | 429/204 |

(56) References Cited

U.S. PATENT DOCUMENTS

| | | | | |
|---|---|---|---|---|
| 2013/0071735 A1* | 3/2013 | Wertz | H01M 4/68 | 429/204 |
| 2013/0082664 A1* | 4/2013 | Hiraoka | H01M 10/0525 | 320/149 |
| 2013/0113413 A1* | 5/2013 | Harty | H01M 10/465 | 320/101 |
| 2013/0113417 A1* | 5/2013 | Nakashima | H02J 7/045 | 320/107 |
| 2013/0119940 A1* | 5/2013 | Iriyama | H01M 4/485 | 320/134 |
| 2013/0127414 A1* | 5/2013 | Ohtomo | B60L 3/0069 | 320/109 |
| 2013/0127415 A1* | 5/2013 | Ohtomo | B60L 3/003 | 320/109 |
| 2013/0196183 A1* | 8/2013 | Ludtke | H02J 7/0004 | 429/10 |
| 2013/0241485 A1* | 9/2013 | Snyder | B60L 11/1809 | 320/109 |
| 2013/0249562 A1* | 9/2013 | Sakai | G01R 31/3662 | 324/430 |
| 2013/0314050 A1* | 11/2013 | Matsubara | H02J 7/00 | 320/134 |
| 2013/0314093 A1* | 11/2013 | Cheng | G01N 17/02 | 324/425 |
| 2014/0023888 A1* | 1/2014 | Fulop | H01M 2/30 | 429/50 |
| 2014/0035530 A1* | 2/2014 | Shao | B60L 11/185 | 320/109 |
| 2014/0117934 A1* | 5/2014 | Kurikuma | B60L 3/003 | 320/109 |
| 2014/0203634 A1* | 7/2014 | Sugiyama | B60L 1/00 | 307/10.1 |
| 2014/0227585 A1* | 8/2014 | Wertz | H01M 2/1613 | 429/163 |
| 2014/0253023 A1* | 9/2014 | Paryani | H01M 10/0525 | 320/107 |
| 2015/0002101 A1* | 1/2015 | Hasegawa | H01M 4/505 | 320/134 |
| 2015/0022157 A1* | 1/2015 | Takahashi | H01M 10/482 | 320/134 |
| 2015/0028808 A1* | 1/2015 | Bernardi | B60L 11/1809 | 320/109 |
| 2015/0061592 A1* | 3/2015 | Nakasone | B60L 11/1816 | 320/109 |
| 2015/0145483 A1* | 5/2015 | Shinohara | H02J 7/041 | 320/134 |
| 2015/0188106 A1* | 7/2015 | Takeshi | H01M 2/1646 | 429/188 |
| 2015/0200425 A1* | 7/2015 | Iriyama | H01M 4/485 | 320/107 |
| 2015/0295448 A1* | 10/2015 | Sugeno | H01M 10/4207 | 701/22 |
| 2015/0303530 A1* | 10/2015 | Toussaint | H01M 10/44 | 320/134 |
| 2015/0318717 A1* | 11/2015 | Yamauchi | H01M 10/44 | 320/162 |
| 2016/0072313 A1* | 3/2016 | Satou | H02J 7/007 | 320/162 |
| 2016/0118816 A1* | 4/2016 | Honkura | H02J 7/007 | 320/134 |
| 2016/0176308 A1* | 6/2016 | Morikawa | B60L 3/0046 | 320/134 |
| 2016/0185248 A1* | 6/2016 | Aoshima | B60L 3/00 | 701/22 |
| 2016/0190843 A1* | 6/2016 | Yang | H02J 7/0052 | 320/107 |
| 2016/0218544 A1* | 7/2016 | Ogihara | B60L 11/1851 | |
| 2016/0254687 A1* | 9/2016 | Tanaka | H02J 7/045 | |
| 2016/0352114 A1* | 12/2016 | Kaji | H02J 3/24 | |
| 2017/0089984 A1* | 3/2017 | Sakai | G01R 31/3662 | |
| 2017/0214265 A1* | 7/2017 | Stevens | H01M 10/44 | |
| 2017/0310137 A1* | 10/2017 | Ha | H02J 7/0057 | |
| 2018/0048006 A1* | 2/2018 | Kotaka | H01M 8/04641 | |
| 2018/0053952 A1* | 2/2018 | Kotaka | H01M 8/04492 | |

FOREIGN PATENT DOCUMENTS

| | | |
|---|---|---|
| CN | 102386637 | 3/2012 |
| CN | 102549875 | 7/2012 |
| JP | 2013-105701 | 5/2013 |
| KR | 20140014715 A * | 2/2014 |

* cited by examiner

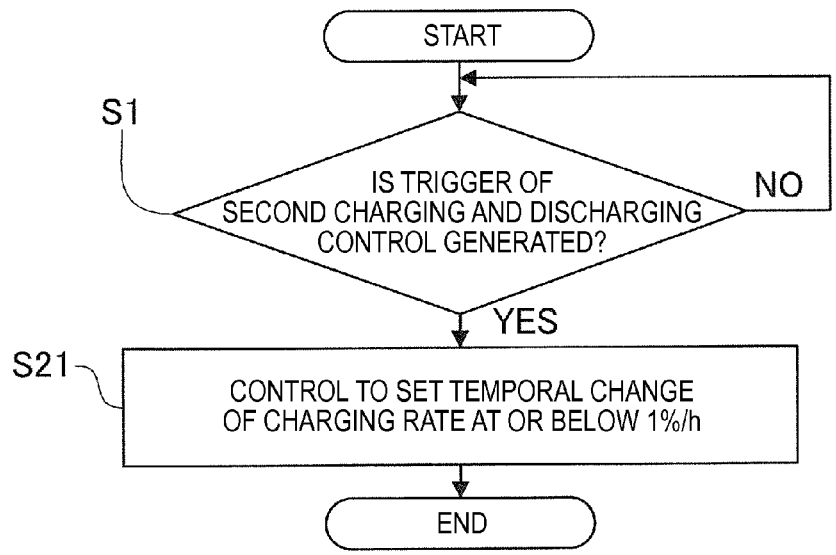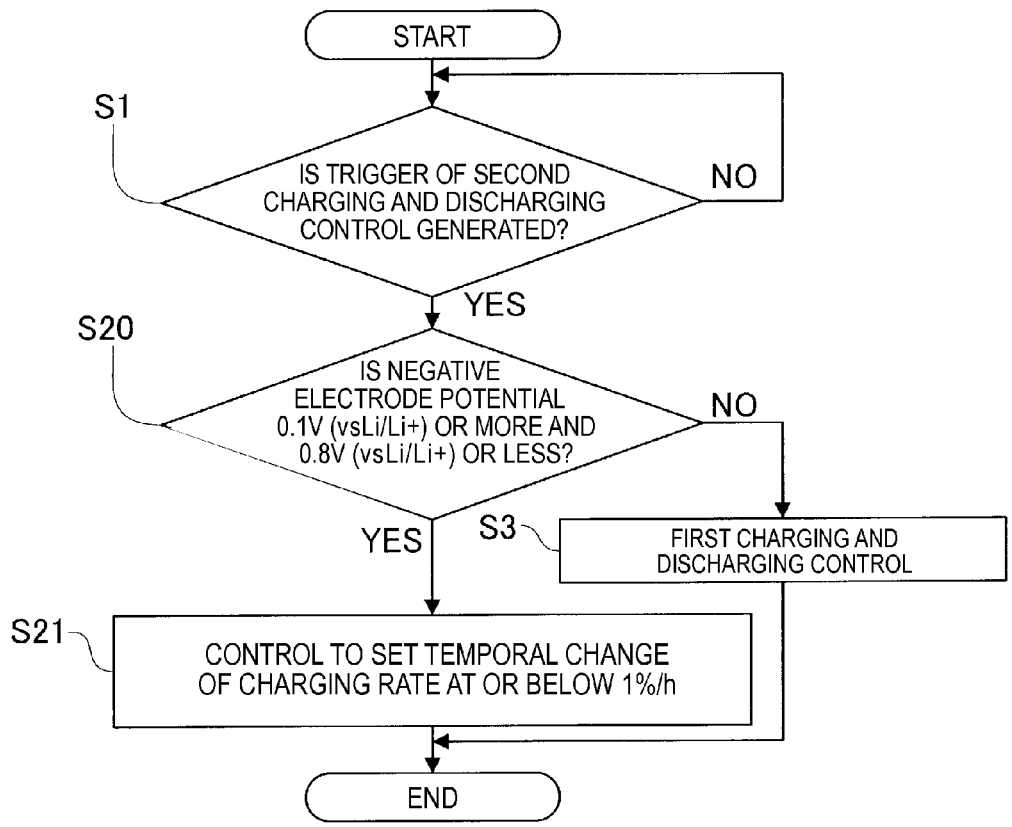

CHARGING CONTROL APPARATUS, BATTERY, ELECTRONIC DEVICE, VEHICLE, CHARGING CONTROL METHOD, AN ELECTRIC STORAGE SYSTEM AND CHARGING CONTROL UNIT

CROSS REFERENCES TO RELATED APPLICATIONS

The present application claims priority to Japanese Priority Patent Application JP 2014-026307 filed in the Japan Patent Office on Feb. 14, 2014, the entire content of which is hereby incorporated by reference.

BACKGROUND

The present disclosure relates to a charging control apparatus, a battery, an electronic device, a vehicle, and a charging control method, an electric storage system and charging control unit. In more detail, the present disclosure relates to a charging and discharging control apparatus, a battery pack, an electronic device, an electric vehicle, and a charging and discharging control method, for controlling charging and discharging of a secondary battery.

In the past, trial has been made to improve the cycle characteristics of a secondary battery by controlling charging and discharging of the secondary battery. For example, in JP 2013-105701A, a method that sets the amount of charge at 50% or less of the theoretical capacity of silicon or at 60% or less of the chargeable capacity is proposed as a charging method of a lithium-ion secondary battery equipped with a negative electrode including silicon.

SUMMARY

It is desirable to improve the cycle characteristics of the secondary battery, while securing the volume energy density of the secondary battery.

The present disclosure provides a charging and discharging control apparatus, a battery pack, an electronic device, an electric vehicle, and a charging and discharging control method, which improve the cycle characteristics while securing the volume energy density.

A charging and discharging control apparatus according to the present disclosure includes a circuit configured to execute second charging and discharging control to control charging and discharging of a secondary battery charged and discharged under first charging and discharging control. Temporal change of a charging rate of the secondary battery when executing the second charging and discharging control is smaller than the temporal change when executing the first charging and discharging control.

The circuit may be configured to control the temporal change of the charging rate of the secondary battery at or below 1%/h, as the second charging and discharging control.

In this case, the circuit may be configured to control the temporal change of the charging rate of the secondary battery at or below 1%/h when a negative electrode potential of the secondary battery is at least within a range of 0.1 V (vs Li/Li+) or more and 0.8 V (vs Li/Li+) or less, as the second charging and discharging control.

Alternatively, the circuit may be configured to execute the second charging and discharging control on the basis of a detection result of a state of the secondary battery.

In this case, the state of the secondary battery may include at least one of a voltage value, a temperature, a charge integrated capacity, and a discharge integrated capacity of the secondary battery, and the circuit may be configured to execute the second charging and discharging control when the detection result of the state of the secondary battery satisfies a specific condition.

Alternatively, the circuit may be configured to conduct OCV (open circuit voltage) measurement of the secondary battery, as the second charging and discharging control.

Note that the OCV measurement in the present disclosure means intermittent charging and discharging control that repeats charging and discharging control and open-circuit voltage measurement control alternately.

A battery pack according to the present disclosure includes a secondary battery, and a charging and discharging control apparatus including a circuit configured to execute second charging and discharging control to control charging and discharging of the secondary battery charged and discharged under first charging and discharging control. Temporal change of a charging rate of the secondary battery when executing the second charging and discharging control is smaller than the temporal change when executing the first charging and discharging control.

The secondary battery may be a lithium-ion secondary battery including at least one kind of Si-containing compound in a negative electrode.

An electronic device according to the present disclosure includes a secondary battery, and a charging and discharging control apparatus including a circuit configured to execute second charging and discharging control to control charging and discharging of the secondary battery charged and discharged under first charging and discharging control. Temporal change of a charging rate of the secondary battery when executing the second charging and discharging control is smaller than the temporal change when executing the first charging and discharging control, and the electronic device is configured to receive electric power supply from the secondary battery.

An electric vehicle according to the present disclosure includes a secondary battery, a charging and discharging control apparatus including a circuit configured to execute second charging and discharging control to control charging and discharging of the secondary battery charged and discharged under first charging and discharging control, and a converter configured to convert electric power supply received from the secondary battery to vehicle driving force. Temporal change of a charging rate of the secondary battery when executing the second charging and discharging control is smaller than the temporal change when executing the first charging and discharging control.

A charging and discharging control method according to the present disclosure includes controlling charging and discharging of a secondary battery charged and discharged under first charging and discharging control, in accordance with second charging and discharging control. Temporal change of a charging rate of the secondary battery when executing the second charging and discharging control is smaller than the temporal change when executing the first charging and discharging control.

In one embodiment, a charging control apparatus is provided and includes a control unit configured to transmit instructions to a charging unit to execute charging of a battery. The control unit is configured to cause a scheme change from a first charging scheme to a second charging scheme based on charging scheme information received by the control unit.

In another embodiment, a charging control apparatus includes a control unit. The control unit includes a first control unit configured to transmit instructions to a charging unit to execute charging of a battery, and a second control unit configured to transmit instructions to the charging unit to execute charging of the battery with a temporal change of a charging rate being less than a temporal change of a charging rate of the first control unit.

In another embodiment, a battery includes a battery unit, and a control unit configured to transmit instructions to a charging unit to execute charging of the battery unit. The control unit is configured to cause a scheme change from a first charging scheme to a second charging scheme based on charging scheme information received by the control unit.

In another embodiment, an electronic device includes a battery unit, and a control unit configured to transmit instructions to a charging unit to execute charging of the battery unit. The control unit is configured to cause a scheme change from a first charging scheme to a second charging scheme based on charging scheme information received by the control unit.

In another embodiment, a vehicle includes a battery unit, a control unit configured to transmit instructions to a charging unit to execute charging of the battery unit, and a converter configured to convert electric power supplied from the battery unit to a vehicle driving force. The control unit is configured to cause a scheme change from a first charging scheme to a second charging scheme based on charging scheme information received by the control unit.

In another embodiment, a charging control method includes transmitting instructions to a charging unit to execute charging of a battery, and changing from a first charging scheme to a second charging scheme based on charging scheme information received by a control unit. In another embodiment, an electric storage system includes a charging control apparatus. The charging control apparatus includes a control unit configured to transmit instructions to a charging unit to execute charging of a battery; a server connected to the charging control apparatus. The control unit is configured to cause a scheme change from a first charging scheme to a second charging scheme based on charging scheme information received by the control unit.

In another embodiment, a charging control unit is configured to transmit instructions to a charging unit to execute charging of a battery. The charging control unit is configured to cause a scheme change from a first charging scheme to a second charging scheme based on charging scheme information.

According to the present disclosure, the cycle characteristics are improved, while securing the volume energy density.

Additional features and advantages are described herein, and will be apparent from the following Detailed Description and the figures.

BRIEF DESCRIPTION OF THE FIGURES

FIG. 5 is a flowchart illustrating an exemplary operation of a charging and discharging control apparatus of a second embodiment of the present disclosure;

FIG. 6 is a flowchart illustrating an exemplary operation of a charging and discharging control apparatus of a first variant example of a second embodiment of the present disclosure;

DETAILED DESCRIPTION

Figure 1:
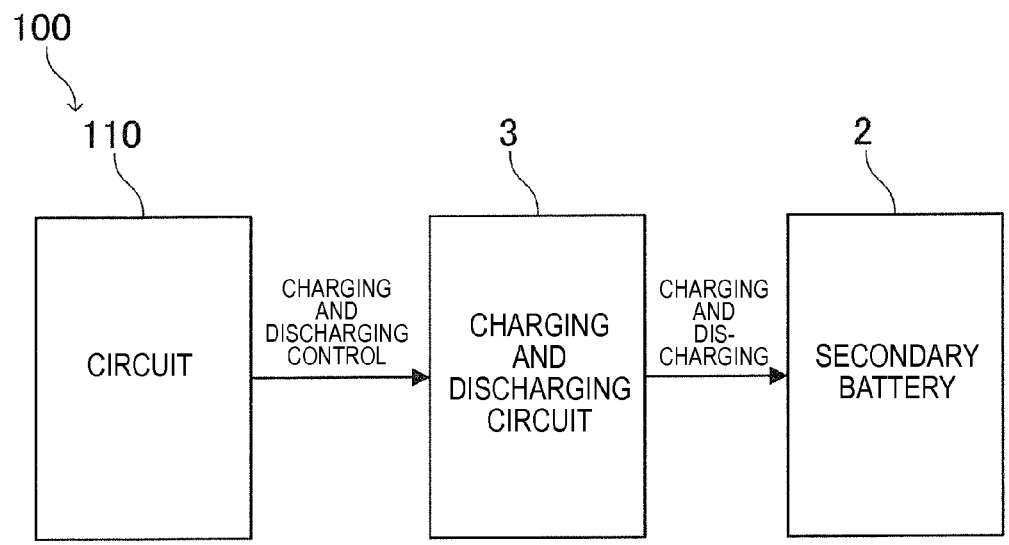
FIG. 1 is a schematic diagram illustrating an exemplary configuration of a charging and discharging control apparatus of a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Description will be made in the following order.

1. The first embodiment (an example of the charging and discharging control apparatus configured to control, by the second charging and discharging control, the charging and discharging of the secondary battery that has been charged and discharged under the first charging and discharging control)

2. The first variant example of the first embodiment (an example of the charging and discharging control apparatus that also executes the first charging and discharging control)

3. The second embodiment (an example of the charging and discharging control apparatus configured to control the temporal change of the charging rate at or below 1%/h, as the second charging and discharging control)

4. The first variant example of the second embodiment (an example of the charging and discharging control apparatus configured to control the temporal change of the charging rate at or below 1%/h, while the negative electrode potential of the secondary battery is within a range of 0.1 V (vs Li/Li+) or more and 0.8 V (vs Li/Li+)) or less 5. The third embodiment (an example of the charging and discharging control apparatus configured to execute the second charging and discharging control on the basis of a detection result of the state of the secondary battery)
6. The first variant example of the third embodiment (an example of the charging and discharging control apparatus configured to acquire the state of the secondary battery through communication)
7. The fourth embodiment (an example of the charging and discharging control apparatus configured to conduct the OCV measurement of the secondary battery as the second charging and discharging control)
8. The fifth embodiment (an example of the battery pack equipped with the charging and discharging control apparatus)
9. The sixth embodiment (an example of the electronic device equipped with the charging and discharging control apparatus)
10. The seventh embodiment (an example of the electric vehicle equipped with the charging and discharging control apparatus)
11. The eighth embodiment (an example of the electricity storage system equipped with the charging and discharging control apparatus)

1. First Embodiment

Exemplary Configuration of Apparatus

FIG. 1 is a schematic diagram illustrating the exemplary configuration of the charging and discharging control apparatus 100 of the present embodiment. The charging and discharging control apparatus 100 has a circuit 110, as illustrated in FIG. 1. The circuit 110 is connected to a charging and discharging circuit 3 used in charging and discharging of the secondary battery 2, i.e., the cell. The number of the secondary battery 2 is arbitrary.

[Circuit 110]

The circuit 110 is a component to control the charging and discharging of the secondary battery 2. The circuit 110 controls the charging and discharging of the secondary battery 2, by controlling the charging and discharging operation of the secondary battery 2 by the charging and discharging circuit 3. For example, the circuit 110 may control the state of the voltage and the current applied on the secondary battery 2 at the time of the charging and discharging of the secondary battery 2, by electrically controlling a circuit element located in the charging and discharging circuit 3. The form of the circuit element of the charging and discharging circuit 3 is not limited specifically. For example, the circuit element may include a switch to open and close a power-supply line of the charging and discharging circuit 3, an element for regulating the charge and discharge current, such as a variable resistor and a power transistor, on the power-supply line, the element for setting the charge voltage such as the variable resistor connected to the power-supply line, and others. The circuit 110 may be mounted on the same substrate as the charging and discharging circuit 3, but is not limited thereto.

The circuit 110 may be an integrated circuit (IC). The circuit 110 may be provided with an operation processor such as a CPU (Central Processing Unit) and an MPU (Micro-Processing Unit), a storage device such as a RAM (Random Access Memory) and a ROM (Read Only Memory), and others. In that case, the charging and discharging control program and data to implement the function of the circuit 110 may be stored in the ROM. The operation processor may implement the function of the circuit 110, by executing the program stored in the ROM. The RAM may be utilized as the work area of the operation processor.

The circuit 110 controls, by the second charging and discharging control, the charging and discharging of the secondary battery 2 that has been charged and discharged under the first charging and discharging control. The second charging and discharging control is the control of the charging and discharging of the secondary battery 2, and is the control which reduces the temporal change of the charging rate (SOC (state of charge)) of the secondary battery 2 as compared with the first charging and discharging control.

The form of the first charging and discharging control is not limited specifically. For example, the first charging and discharging control may be a normal charging and discharging control.

The form of the second charging and discharging control is not limited specifically either. For example, the second charging and discharging control may be one of the forms illustrated in the following items A to C.

A. Providing a downtime of the charging and discharging, during the charging and discharging under the first charging and discharging control. In this case, providing the downtime may be equal to conducting the charging and discharging intermittently, for example.

B. Reducing the current density of the charge and discharge current, during the charging and discharging under the first charging and discharging control.

C. Changing infinitesimally, step by step, the charge and discharge voltage, during the charging and discharging under the first charging and discharging control.

Here, "during the charging and discharging under the first charging and discharging control" means that the charging and discharging under the first charging and discharging control is once interrupted, and the charging and discharging under the first charging and discharging control is resumed after conducting the charging and discharging under the second charging and discharging control.

[Secondary Battery 2]

The form of the secondary battery 2 is not limited specifically. For example, the secondary battery 2 is of what is called a laminate film type, and may be provided with a wound electrode body inside the film-like exterior member. In this case, the wound electrode body is a body including a positive electrode and a negative electrode laminated and wound with a separator and an electrolyte layer therebetween. A positive electrode lead may be attached to the positive electrode, and a negative electrode lead may be attached to the negative electrode. The outermost circumferential area of the wound electrode body may be protected by a protective tape.

In further detail, the positive electrode and the negative electrode may face each other via the separator. The electrolyte layer may be located between the positive electrode and the separator, and may be located between the negative electrode and the separator.

The positive electrode lead and the negative electrode lead may be led out in the same direction from the inside toward the outside of the exterior member, for example. The positive electrode lead may be formed of conductive material such as aluminum, for example. The negative electrode lead may be formed of a conductive material such as copper, nickel, or stainless steel, for example. The shape of these conductive material may be such as thin plate-like, or net-like, for example.

The exterior member may be a laminate film in which a bonding layer, a metal layer, and a surface protective layer are laminated in this order, for example. In this case, in the laminate film, the outer peripheries of the bonding layers of two sheet films may be bonded to each other in such a manner that the bonding layers face the wound electrode body, for example. Note that, two sheet of the films may be stuck together via adhesive agent or the like. The bonding layer may be a film of polyethylene, polypropylene or the like, for example. The metal layer may be an aluminum foil or the like, for example. The surface protective layer may be a film of nylon, polyethylene terephthalate or the like, for example. In particular, it is desirable that the exterior member is an aluminum laminated film in which a polyethylene film, an aluminum foil, and a nylon film are laminated in this order. Note that, the exterior member may be a laminate film having another laminate structure, or a polymer film of polypropylene or the like, or a metal film. The sealing film may be inserted between the exterior member and each of the positive electrode lead and the negative electrode lead, in order to prevent the intrusion of the outer air. In this case, the sealing film may be formed of material that can closely contact the positive electrode lead and the negative electrode lead. In this case, the material that can closely contact may be a polyolefin resin such as polyethylene, polypropylene, modified polyethylene, modified polypropylene, for example.

The positive electrode has a positive electrode active material layer on one surface or both surfaces of a positive electrode current collector. The positive electrode current collector is formed of a conductive material such as, for example, aluminum, nickel and stainless steel. The positive electrode active material layer includes any one kind of or any two or more kinds of positive electrode material capable of absorbing and releasing lithium ions as the positive electrode active material, and may include another material such as a positive electrode binder agent and a positive electrode conductive agent, as necessary.

It is desirable that the positive electrode material be a lithium-containing compound, because high energy density is obtained. This lithium-containing compound may be such as a lithium-transition metal composite oxide, and a lithium transition metal phosphate compound, for example. Here, the lithium-transition metal composite oxide is an oxide that includes Li and one or two or more transition metal elements as constituent elements. The lithium transition metal phosphate compound is a phosphate compound that includes Li and one or two or more transition metal elements as constituent elements. It is desirable that the transition metal element be any one kind of or any two or more kinds of Co, Ni, Mn, Fe, and the like, particularly, because a higher voltage is obtained. The chemical formula is represented by $Li_xM1O_2$ and $Li_yM2PO_4$ for example. In the formula, each of M1 and M2 is one or more kinds of transition metal elements. The values of x and y are different depending on the charging and discharging state, and are for example $0.05 \leq x \leq 1.1$, $0.05 \leq y \leq 1.1$.

The lithium-transition metal composite oxide is $LiCoO_2$, $LiNiO_2$, a lithium-nickel-based composite oxide represented by below formula (1), or the like, for example.

$$LiNi_{1-z}M_zO_2 \qquad (1)$$

Note that, in formula (1), M is any one kind of or any two or more kinds of Co, Mn, Fe, Al, V, Sn, Mg, Ti, Sr, Ca, Zr, Mo, Tc, Ru, Ta, W, Re, Yb, Cu, Zn, Ba, B, Cr, Si, Ga, P, Sb and Nb. Also, z satisfies $0.005 < z < 0.5$.

It is desirable that the lithium transition metal phosphate compound be $LiFePO_4$, $LiFe_{1-u}Mn_uPO_4$ (u<1) or the like, for example, because a large battery capacity and excellent cycle characteristics are obtained.

In addition, the positive electrode material may be any one kind of or any two or more kinds of oxides, disulfides, chalcogenides, conductive polymers and the like, for example. In this case, the oxide may be such as a titanium oxide, a vanadium oxide, and a manganese dioxide, for example. The disulfide may be such as a titanium disulfide, and a molybdenum sulfide, for example. The chalcogenide may be such as a niobium selenide, for example. The conductive polymer may be such as sulfur, polyaniline, and polythiophene, for example. However, the positive electrode material may be a material other than the above.

For example, the positive electrode binder agent may be any one kind of or any two or more kinds of synthetic rubbers, polymeric materials, and the like. In this case, the synthetic rubber may be such as a styrene-butadiene rubber, a fluorine-based rubber, and ethylene propylene diene, for example. The polymeric material may be such as polyvinylidene fluoride, and polyimide, for example.

The positive electrode conductive agent may be, for example, any one kind of or any two or more kinds of carbon materials and the like. In this case, the carbon material may be such as graphite, carbon black, acetylene black, and ketjen black, for example. Note that the positive electrode conductive agent may be such as a metallic material, and a conductive polymer, as long as the material has conductivity.

The negative electrode active material layer includes a negative electrode active material and a negative electrode binder agent. The negative electrode active material may include any one kind of or any two or more kinds of negative electrode materials capable of absorbing and releasing lithium ions. However, the negative electrode active material layer may include another material such as a negative electrode conductive agent, as necessary. The detail of the negative electrode conductive agent may be same as the positive electrode conductive agent described above, for example.

In order to prevent the lithium metal from depositing on the negative electrode unintentionally during the charging, it is desirable that the chargeable capacity of the negative electrode material be greater than the discharge capacity of the positive electrode. In other words, it is desirable that the electrochemical equivalent of the negative electrode material capable of absorbing and releasing lithium ions be greater than the electrochemical equivalent of the positive electrode.

A material including, as a constituent element, any one kind of or any two or more kinds of metallic elements or metalloid elements that reacts with Li, i.e., a metal-based material (hereinafter, referred to as the first negative electrode active material ingredient) can be taken as one example of a preferred form of the negative electrode active material ingredient. According to the first negative electrode active material ingredient, high energy density is obtained. The first negative electrode active material ingredient may be a single body, an alloy, or a compound, or may be two or more kinds thereof, or may be a material having one kind of or two or more kinds of those phases at least partially. In this case, "alloy" may include a material including one or more kinds of metallic elements and one or more kinds of metalloid elements, in addition to a material consisting of two or more kinds of metallic elements. Also, "alloy" may include a non-metallic element. The structure of "alloy" may include such as a solid solution, a eutectic, i.e. a eutectic mixture, an intermetallic compound, or two or more kinds of coexisting materials thereof.

The metallic element or the metalloid element described above may be any one kind of or any two or more kinds of metallic elements and metalloid elements capable of forming an alloy with a lithium ion, for example. More specifically, the metallic element or the metalloid element described above may be such as Mg, B, Al, Ga, In, Si, Ge, Sn, Pb, Bi, Cd, Ag, Zn, Hf, Zr, Y, Pd, and Pt. In particular, one or both of Si and Sn are preferable, because of excellent capability of absorbing and releasing lithium ions, which results in high energy density and a large battery capacity.

The material including one or both of Si and Sn as a constituent element (high capacity material) may be a single body, an alloy, or a compound of Si or Sn, or may be two or more kinds thereof, or may be a material including one kind of or two or more kinds of those phases at least partially. Note that, the "single body" referred here is a single body in the general meaning consistently, and may include a tiny amount of impurities, and does not mean 100% purity necessarily.

The alloy of Si may include, for example, any one kind of or any two or more kinds of elements such as Sn, Ni, Cu, Fe, Co, Mn, Zn, In, Ag, Ti, Ge, Bi, Sb, and Cr, as a constituent element other than Si. The compound of Si may include any one kind of or any two or more kinds of C, O and the like, as a constituent element other than Si, for example. Note that the compound of Si may include any one kind of or any two or more kinds of elements described with respect to the alloy of Si, as a constituent element other than Si, for example.

Specific examples of the alloy or the compound of Si are $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $Li_xSiO_y$ ($0<x\leq4$, $0<y\leq4$), and the like. Note that, with regard to v in $SiO_v$, $0.2<v<1.4$ is preferable, and $0.8<v<1.2$ is more preferable. Also, these alloys and compounds may absorb lithium in advance.

The alloy of Sn may include, for example, any one kind of or any two or more kinds of Si, Ni, Cu, Fe, Co, Mn, Zn, In, Ag, Ti, Ge, Bi, Sb, Cr, and the like, as a constituent element other than Sn. In this case, the compound of Sn may include, for example, any one kind of or any two or more kinds of C, O and the like, as a constituent element other than Sn. Note that, the compound of Sn may include, for example, any one kind of or any two or more kinds of elements described with respect to the alloy of Sn, as a constituent element other than Sn. A specific example of the alloy or the compound of Sn may be such as $SnO_w$ ($0<w\leq2$), $SnSiO_3$, LiSnO, and $Mg_2Sn$.

As a material including Sn as a constituent element in particular, a material including the first constituent element of Sn and the second and third constituent elements additionally is preferable, for example. The second constituent element is, for example, any one kind of or any two or more kinds of Co, Fe, Mg, Ti, V, Cr, Mn, Ni, Cu, Zn, Ga, Zr, Nb, Mo, Ag, In, Ce, Hf, Ta, W, Bi, Si, and the like. The third constituent element is, for example, any one kind of or any two or more kinds of B, C, Al, P, and the like. This is because high energy density is obtained by including the second and third constituent elements.

A material including Sn, Co and C as a constituent element in particular, i.e. SnCoC-containing material is preferable, because high energy density is obtained. In this SnCoC-containing material, for example, the content of C may be from 9.9 mass % to 29.7 mass %, and the proportion of the content of Sn and Co (Co/(Sn+Co)) may be from 20 mass % to 70 mass %.

It is desirable that the SnCoC-containing material have a phase including Sn, Co and C, and a low crystallinity or amorphous phase. Since this phase is a reaction phase that can react with Li, the excellent characteristics are obtained by the presence of the reaction phase. It is desirable that the half width of the diffraction peak obtained by the X-ray diffraction of this phase be equal to or more than 1° at a diffraction angle 2θ, where a Cu—Kα ray is used as a specific X-ray and a sweeping rate is 1°/min. One reason is that the lithium ions are absorbed and released smoothly, and reactivity with the electrolyte is reduced. It is to be noted that the SnCoC-containing material may include, in addition to the low crystallinity or amorphous phase, a phase including a single body of or a part of a constituent element.

Whether or not the diffraction peak obtained by the X-ray diffraction corresponds to the reaction phase that can reacts with Li can be easily determined by comparing the X-ray diffraction charts before and after the electrochemical reaction with Li. For example, if the position of the diffraction peak changes before and after the electrochemical reaction with Li, the diffraction peak corresponds to the reaction phase that can react with Li. In this case, for example, the diffraction peak of the low crystallinity or amorphous reaction phase is observed while 2θ=20° to 50°. For example, such a reaction phase includes each constituent element described above, and is considered to be low-crystallized or amorphized primarily due to the presence of C.

In the SnCoC-containing material, it is desirable that at least a part of C serving as a constituent element be bonded to the metal element or the metalloid element serving as other constituent elements, since this suppresses condensation or crystallization of Sn and the like. The bonding state of the elements can be confirmed using the X-ray photoelectron spectroscopy (XPS), for example. In the commercially available devices, an Al—Kα ray, a Mg—Kα ray and the like are used as soft X-rays, for example. When at least a part of C is bonded to the metallic element, the metalloid element or the like, the peak of the synthetic wave of 1s orbital (C1s) of C appears in a region lower than 284.5 eV. Note that energy calibration is carried out in such a manner that the peak of 4f orbital of Au atom (Au4f) is obtained at 84.0 eV. At this, since a surface-contaminating carbon is normally present on a substance surface, the peak of C1s of the surface-contaminating carbon is set at 284.8 eV, which is defined as an energy reference. In the XPS measurement, since the waveform of the peak of C1s is obtained in the form that includes the peak of the surface-contaminating carbon and the peak of carbon in the SnCoC-containing material, two peaks are separated from each other, by analyzing the waveform using commercially available software, for example. In the analysis of the waveform, the position of the main peak present at the minimum binding energy side is defined as the energy reference (284.8 eV).

Note that the SnCoC-containing material is not limited to a material (SnCoC) that includes only Sn, Co and C as the constituent elements. This SnCoC-containing material may further include, for example, any one kind of or any two or more kinds of Si, Fe, Ni, Cr, In, Nb, Ge, Ti, Mo, Al, P, Ga, Bi and the like, in addition to Sn, Co and C, as constituent elements.

Aside from the SnCoC-containing material, a material including Sn, Co, Fe and C as constituent elements (SnCoFeC-containing material) is also preferable. The composition of this SnCoFeC-containing material is arbitrary. For example, when the content of Fe is set small, the content of C is from 9.9 mass % to 29.7 mass %, and the content of Fe is from 0.3 mass % to 5.9 mass %, and the proportion of the content of Sn and Co (Co/(Sn+Co)) is from 30 mass % to 70 mass %. When the content of Fe is set large, the content of C is from 11.9 to 29.7 mass %, and the proportion of the content of Sn, Co, Fe ((Co+Fe)/(Sn+Co+Fe)) is from 26.4 to 48.5 mass %, and the proportion of the content of Co, Fe (Co/(Co+Fe)) is from 9.9 to 79.5 mass %, because high energy density is obtained with this composition. Note that the physical properties (the half width, etc) of the SnCoFeC-containing material are similar to the SnCoC-containing material described above.

As one example of a preferred form of the negative electrode active material ingredient other than the first negative electrode active material ingredient described above, a carbon material including graphite (hereinafter, referred to as the second negative electrode active material ingredient) can be taken. One reason is that, according to the second negative electrode active material ingredient, the electric potential is low while the lithium ions are absorbed, and thereby high energy density is obtained. Another reason is that the second negative electrode active material ingredient serves as a conductive agent as well. The second negative electrode active material ingredient may be such as natural graphite, artificial graphite, or those materials coated with amorphous carbon, for example. The shape of the second negative electrode active material ingredient may be fibrous, spherical, granular, scale-like, etc.

In addition, the negative electrode material may be, for example, any one kind of or any two or more kinds of easily graphitizable carbons, hardly graphitizable carbons, metal oxides, polymer compounds, and the like. In this case, the metal oxide may be such as an iron oxide, a ruthenium oxide, and a molybdenum oxide, for example. The polymer compound is, for example, polyacetylene, polyaniline, polypyrrole, or the like. Note that the negative electrode material may be another material other than the above.

The separator isolates the positive electrode and the negative electrode from each other, and allows the lithium ions to pass therethrough while preventing a short circuit of a current caused by contacting of both poles. The separator is, for example, a porous membrane of a synthetic resin, a ceramic or the like, and may be a laminated membrane in which two or more kinds of porous membranes are laminated. The synthetic resin may be such as polytetrafluoroethylene, polypropylene, and polyethylene, for example.

The negative electrode binder agent may include any one kind of or any two or more kinds of polymer compounds and the like, for example. The polymer compound may be such as polytetrafluoroethylene, polyvinylidene fluoride, carboxymethyl cellulose, fluoro-olefin copolymer cross-linked polymer, polyvinyl alcohol, polyacrylic acid, polyimide, phenolic resin, natural latex, styrene-butadiene rubber, or nitrile-butadiene rubber. In summary, the negative electrode binder agent may be either solvent based or water based.

The electrolyte includes a solvent and an electrolyte salt, and may include other materials such as additives, as necessary.

In this case, the solvent may include any one kind of or any two or more kinds of non-aqueous solvents such as organic solvents. In this case, it is desirable that the non-aqueous solvent be, for example, cyclic carbonate ester, chain carbonate ester, lactone, chain carboxylic acid ester, nitrile, or the like, because an excellent battery capacity, cycle characteristics, and preservation characteristics are obtained. In this case, the cyclic carbonate ester may be such as ethylene carbonate, propylene carbonate, and butylene carbonate, for example. Also, the chain carbonate ester may be such as dimethyl carbonate, diethyl carbonate, ethyl methyl carbonate, and methyl propyl carbonate, for example. Also, the lactone may be such as γ-butyrolactone and γ-valerolactone, for example. Also, the carboxylic acid ester may be such as methyl acetate, ethyl acetate, methyl propionate, ethyl propionate, methyl butyrate, methyl isobutyrate, methyl trimethylacetate, and ethyl trimethylacetate for example. Also, the nitrile may be such as acetonitrile, glutaronitrile, adiponitrile, methoxyacetonitrile, and 3-methoxy propionitrile, for example.

The non-aqueous solvent may be such as 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethyl formamide, N-methyl pyrrolidinone, N-methyl oxazolidinone, N,N'-dimethylimidazolidinone, nitromethane, nitroethane, sulfolane, trimethyl phosphate, or dimethyl sulfoxide.

In particular, any one kind of or any two or more kinds of ethylene carbonate, propylene carbonate, dimethyl carbonate, diethyl carbonate, and ethyl methyl carbonate are preferable, because more excellent battery capacity, cycle characteristics and preservation characteristics are obtained. In this case, a combination of a high-viscosity or high-permittivity solvent (for example, relative permittivity $\varepsilon \geq 30$) such as ethylene carbonate and propylene carbonate, and a low-viscosity solvent (for example, viscosity $\leq 1$ mPa·s) such as dimethyl carbonate, ethyl methyl carbonate, and diethyl carbonate, is more preferable, because the dissociability of the electrolyte salt and the mobility of ion are improved.

In particular, it is desirable that the solvent include any one kind of or any two or more kinds of unsaturated cyclic carbonate esters, because the stable protective film is formed mainly on the surface of the negative electrode during charging and discharging, and thereby the decomposition reaction of the electrolyte is suppressed. Here, the unsaturated cyclic carbonate ester is the cyclic carbonate ester including one or two or more unsaturated carbon bonds (the carbon-carbon double bond), and is, for example, vinylene carbonate, vinyl ethylene carbonate, methylene ethylene carbonate or the like. The content of the unsaturated cyclic carbonate ester in the solvent is not limited particularly, but may be 0.01 weight % to 10 weight %, for example.

Also, it is desirable that the solvent include any one kind of or any two or more kinds of halogenated carbonate esters, because the stable protective film is formed mainly on the surface of the negative electrode during the charging and discharging, and thereby the decomposition reaction of the electrolyte is suppressed. Here, the halogenated carbonate ester is a cyclic or chain carbonate ester including one or two or more halogens as a constituent element. The cyclic halogenated carbonate ester may be such as 4-fluoro-1,3-dioxolan-2-one and 4,5-difluoro-1,3-dioxolan-2-one, for example. The chain halogenated carbonate ester may be such as fluoromethylmethyl carbonate, bis(fluoromethyl) carbonate, and difluoromethylmethyl carbonate, for example. The content of the halogenated carbonate ester in the solvent is not limited particularly, but may be from 0.01 weight % to 50 weight %, for example.

Also, it is desirable that the solvent include any one kind of or any two or more kinds of sultones or cyclic sulfonate esters, because the chemical stability of the electrolyte is improved more. The sultone may be such as propane sultone and propene sultone, for example. The content of the sultone in the solvent is not limited particularly, but may be from 0.5 weight % to 5 weight %, for example.

Further, it is desirable that the solvent include any one kind of or any two or more kinds of acid anhydrides, because the chemical stability of the electrolyte is improved more. In this case, the acid anhydride may be such as carboxylic acid anhydride, disulfonic acid anhydride, and carboxylic acid sulfonic acid anhydride, for example. In this case, the carboxylic acid anhydride may be such as succinic anhydride, glutaric anhydride, and maleic acid anhydride, for example. Also, the disulfonic acid anhydride can be such as an ethane disulfonic acid anhydride and propane disulfonic acid anhydride, for example. Also, the carboxylic acid sulfonic acid anhydride may be such as sulfobenzoic acid anhydride, sulfopropionic acid anhydride, and sulfobutyric acid anhydride, for example. The content of the acid anhydride in the solvent is not limited particularly, but may be from 0.5 weight % to 5 weight %, for example.

The electrolyte salt includes any one kind of or any two or more kinds of lithium salts for example, and may include salts other than the lithium salts (for example, a light metal salt other than the lithium salts, etc) as necessary.

The lithium salt may be such as lithium hexafluorophosphate ($LiPF_6$), lithium tetrafluoroborate ($LiBF_4$), lithium perchloride ($LiClO_4$), lithium tetrafluoroarsenate ($LiAsF_6$), lithium tetraphenylborate ($LiB(C_6H_5)_4$), lithium methansulfonic acid ($LiCH_3SO_3$), lithium trifluoromethane-sulfonic acid ($LiCF_3SO_3$), lithium tetrachloroaluminate ($LiAlCl_4$), di-lithium tetrafluorosilicate ($Li_2SiF_6$), lithium chloride (LiCl), or lithium borate (LiBr). One reason is that the excellent battery capacity, cycle characteristics, and preservation characteristics are obtained.

In particular, any one kind of or any two or more kinds of $LiPF_6$, $LiBF_4$, $LiClO_4$ and $LiAsF_6$ are preferable, and $LiPF_6$ is more preferable. One reason is that the internal resistance decreases, and larger effect is obtained. It is desirable that the content of the electrolyte salt be from 0.3 mol/kg to 3.0 mol/kg for the solvent. One reason is that a high ionic conductivity is obtained.

[Manufacturing Method of Secondary Battery]

The secondary battery 2 may be manufactured by the following procedure, for example.

In the first procedure, the positive electrode is fabricated first. In this case, the positive electrode active material is mixed with the positive electrode binder agent, the positive electrode conductive agent and the like as necessary, to produce a positive electrode mixture. Subsequently, the positive electrode mixture is dispersed in the organic solvent or the like, to produce the paste-like positive electrode mixture slurry. Subsequently, the positive electrode mixture slurry is coated and dried on both surfaces of the positive electrode current collector, to form the positive electrode active material layer. Subsequently, the positive electrode active material layer is compressed and molded using the roll pressing machine or the like, while heated as necessary. In this case, the compression molding may be repeated more than once.

Also, the negative electrode is fabricated by the procedure same as the positive electrode described above. In this case, the negative electrode mixture including the mixed negative electrode active material, negative electrode binder agent or binder polymer compound, and negative electrode conductive agent and the like as necessary is dispersed in the organic solvent or the like, to produce a paste-like negative electrode mixture slurry. Subsequently, the negative electrode mixture slurry is coated and dried on both surfaces of the negative electrode current collector, to form the negative electrode active material layer, and thereafter the negative electrode active material layer is compressed and molded as necessary.

Subsequently, an adhesive layer is formed on the negative electrode. In this case, the adhesive polymer compound is dispersed in the organic solvent or the like to prepare a process solution, and thereafter the process solution is coated and dried on the surface of the negative electrode active material layer.

Subsequently, a precursor solution including the electrolyte having the electrolyte salt dispersed in the solvent, the electrolyte polymer compound, the solvent such as the organic solvent or the like is prepared, and thereafter the precursor solution is coated on the positive electrode, to form a gel-like electrolyte layer. Subsequently, the positive electrode lead is attached on the positive electrode current collector using the welding method or the like, and the negative electrode lead is attached on the negative electrode current collector using the welding method or the like. Subsequently, the positive electrode and the negative electrode are laminated via the separator and wound to fabricate the wound electrode body, and the protective tape is applied on the outermost circumferential area of the fabricated wound electrode body. Subsequently, the wound electrode body is sandwiched between two sheets of the film-like exterior members, and thereafter the outer peripheries of the exterior members are adhered to each other using the thermal fusion bonding method or the like, to encapsulate the wound electrode body inside the exterior members. In this case, the sealing film is inserted between the positive electrode lead and the negative electrode lead and the exterior members.

In the second procedure, the positive electrode, and the negative electrode are formed by the procedure same as the first procedure, and thereafter the positive electrode lead is attached on the positive electrode, and the negative electrode lead is attached on the negative electrode. Subsequently, the positive electrode and the negative electrode are laminated and wound via the separator to fabricate the wound body as the precursor of the wound electrode body, and the protective tape is applied on the outermost circumferential area of the fabricated wound body. Subsequently, the wound electrode body is sandwiched between two sheets of the film-like exterior members, and thereafter the outer periphery except a side of the outer periphery is adhered using the thermal fusion bonding method or the like, to accommodate the wound body inside the sac-like exterior members. Subsequently, the electrolyte composition including the electrolyte, the monomer as the raw material of the electrolyte polymer compound, a polymerization initiator, and another material such as a polymerization inhibitor as necessary are prepared to be injected into the inside of the sac-like exterior members. After the injection, the exterior members are sealed using the thermal fusion bonding method or the like. Subsequently, the monomer is subjected to thermal polymerization in order to form the electrolyte polymer compound. Thereby, the gel-like electrolyte layer is formed.

In the third procedure, the wound body is fabricated to be accommodated inside the sac-like exterior members, in the same way as the second procedure described above, except for using the separator having the polymer compound coated on both surfaces thereof. The polymer compound coated on the separator may be, for example, a polymer (for example, homopolymer, copolymer, multi-copolymer, or the like) having vinylidene fluoride as the component, or the like. Specifically, the polymer compound may be such as: vinylidene polyfluoride; a binary copolymer having vinylidene fluoride and hexafluoropropylene as the components; and a ternary copolymer having vinylidene fluoride, hexafluoropropylene, and chrorotrifluoroethylene as the components. Note that other one kind of or two or more kinds of polymer compounds may be used together with the polymer having vinylidene fluoride as the component. Subsequently, the electrolyte is prepared to be injected into the inside of the exterior members, and thereafter an openings of the exterior members is sealed using the thermal fusion bonding method or the like. Subsequently, the exterior members are pressed and heated, in order to closely contact the separator with the positive electrode and the negative electrode via the polymer compound. Thereby, the electrolyte is impregnated in the polymer compound, and the polymer compound is turned into a gel to form the electrolyte layer.

In the third procedure, the expansion of the secondary battery is suppressed more than the first procedure. Also, in the third procedure, the monomer as a raw material of the polymer compound, the solvent, and the like hardly remain in the electrolyte layer as compared with the first procedure, and thereby a process of forming the polymer compound is well controlled. Hence, the positive electrode, the negative electrode and the separator closely contact with the electrolyte layer sufficiently.

[Exemplary Operation of Apparatus]

Figure 2:
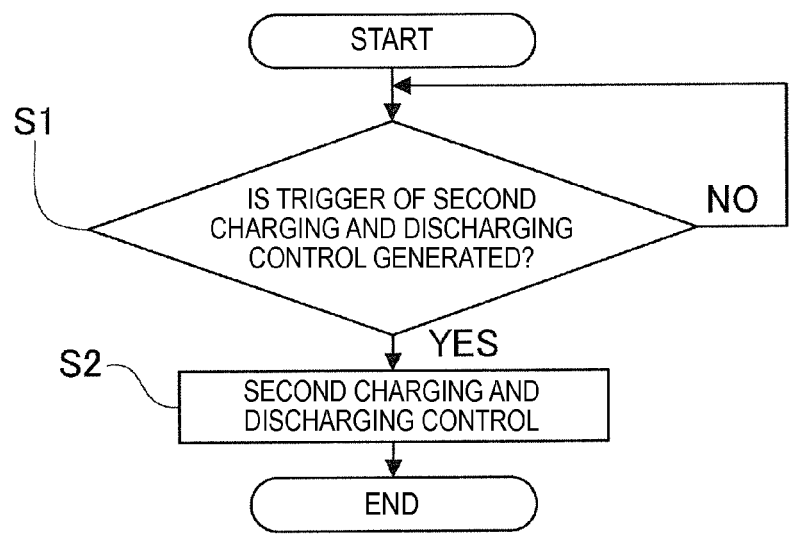
FIG. 2 is a flowchart illustrating an exemplary operation of a charging and discharging control apparatus of a first embodiment of the present disclosure.

FIG. 2 is a flowchart illustrating the exemplary operation of the charging and discharging control apparatus 100 of the present embodiment. The exemplary operation illustrated in FIG. 2 is an embodiment of the charging and discharging control method according to the present disclosure. Note that the charging and discharging control method according to an embodiment of the present disclosure may be realized by a configuration other than the charging and discharging control apparatus 100.

First, in step 1 (S1) of FIG. 2, the presence or absence of the generation of the trigger of the second charging and discharging control is determined by the charging and discharging control apparatus 100. The form of the trigger is not limited specifically, as long as the trigger indicates that the secondary battery 2 is charged or discharged under the first charging and discharging control. The trigger may be the information obtained on the basis of the measurement result of the state of the secondary battery 2. The circuit 110 may conduct the determination of step 1 (S1). Then, the process proceeds to step 2 (S2) if a positive determination result is obtained in step 1 (ST1), and the process repeats step 1 (S1) if a negative determination result is obtained.

Figure 3:
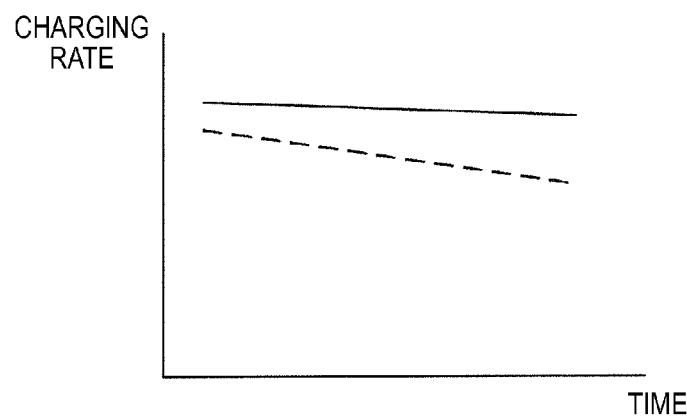
FIG. 3 is a graph schematically illustrating an exemplary operation of a charging and discharging control apparatus of a first embodiment of the present disclosure.

Thereafter, in step 2 (S2), the circuit 110 executes the second charging and discharging control, and the process ends. Here, FIG. 3 has the horizontal axis of time and the vertical axis of the charging rate, and schematically illustrates the temporal change of the charging rate corresponding to each of the first charging and discharging control and the second charging and discharging control. As illustrated in FIG. 3, the temporal change of the charging rate (the solid line of the graph) during discharging under the second charging and discharging control is smaller than the temporal change of the charging rate (the dashed line of the graph) during discharging under the first charging and discharging control.

According to the charging and discharging control apparatus 100 of the present embodiment, the charging and discharging of the secondary battery 2 is performed, under the second charging and discharging control in which the temporal change of the charging rate is small, in order to reduce the internal resistance and improve the cycle characteristics, wherein the secondary battery 2 has the internal resistance increased by the charging and discharging under the first charging and discharging control. Also, since the charging and discharging capacity is not limited and the temporal change of the charging rate is controlled, the improvement of the cycle characteristics of the secondary battery 2 is achieved without reducing the volume energy density of the secondary battery 2.

2. First Variant Example of First Embodiment

Figure 4:
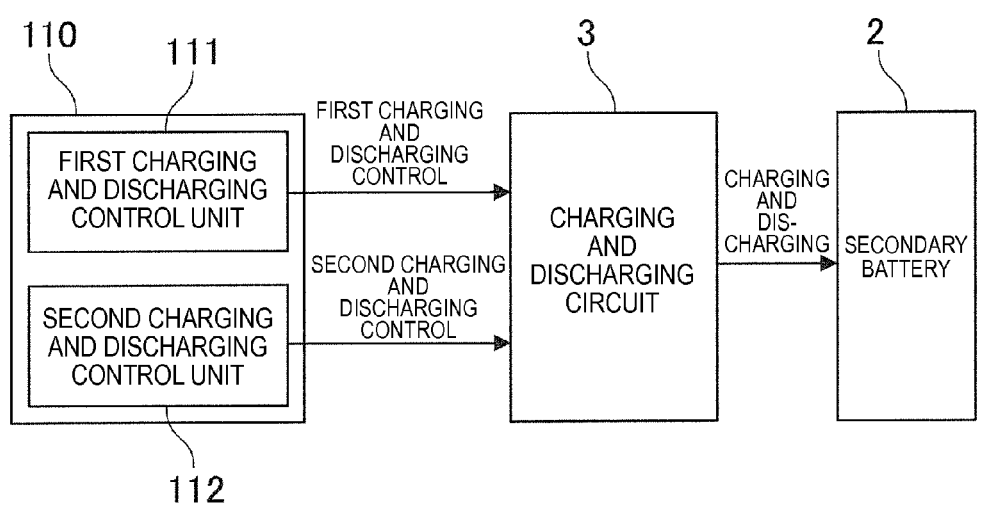
FIG. 4 is a schematic diagram illustrating an exemplary configuration of a charging and discharging control apparatus of a first variant example of a first embodiment of the present disclosure.

FIG. 4 is a schematic diagram illustrating the exemplary configuration of the charging and discharging control apparatus of the first variant example of the present embodiment. The charging and discharging control apparatus 100 of the present variant example has a more specific configuration of the circuit 110, as compared with the charging and discharging control apparatus 100 of FIG. 1.

Specifically, as illustrated in FIG. 4, the circuit 110 of the charging and discharging control apparatus 100 of the present variant example includes a first charging and discharging control unit 111 and a second charging and discharging control unit 112 as the functional blocks. The first charging and discharging control unit 111 is a component to execute the first charging and discharging control to the charging and discharging circuit 3. The second charging and discharging control unit 112 is a component to execute the second charging and discharging control to the charging and discharging circuit 3.

According to the charging and discharging control apparatus 100 of the present variant example, the same action and effect as the charging and discharging control apparatus 100 of FIG. 1 is performed, or the component to execute the first charging and discharging control and the component to execute the second charging and discharging control are integrated in one circuit 110 to simplify the configuration.

3. Second Embodiment

The charging and discharging control apparatus 100 of the present embodiment has a more specific content of the second charging and discharging control, as compared with the charging and discharging control apparatus 100 of the first embodiment.

Specifically, as illustrated in the flowchart of FIG. 5, in the present embodiment, step 21 (S21) is executed as a specific example of step 2 of FIG. 2. In step 21 (S21), a control to set the temporal change of the charging rate at or below 1%/h is executed as the second charging and discharging control.

According to the charging and discharging control apparatus 100 of the present embodiment, the same effect as the first embodiment is performed, or the temporal change of the charging rate is optimized to further improve the cycle characteristics.

4. First Variant Example of Second Embodiment

The charging and discharging control apparatus 100 of the present variant example has a more specific content of the charging and discharging control, as compared with the charging and discharging control apparatus 100 described in FIG. 5. Specifically, the charging and discharging control apparatus 100 of the present variant example is a component in which the circuit 110 executes a control to set the temporal change of the charging rate of the secondary battery 2 at or below 1%/h if the negative electrode potential of the secondary battery 2 is at least within a range of 0.1 V (vs Li/Li+) or more and 0.8 V (vs Li/Li+) or less.

The exemplary operation of the charging and discharging control apparatus 100 of the present variant example is as illustrated in the flowchart of FIG. 6. As illustrated in FIG. 6, in the present variant example, if the positive determination result is obtained in step 1 (S1), the process proceeds to step 20 (S20).

In step 20 (S20), the circuit 110 executes a preliminary process before step 21 (S21) in the second charging and discharging control. Specifically, in step 20 (S20), it is determined whether or not the negative electrode potential of the secondary battery 2 is within a range of 0.1 V (vs Li/Li+) or more and 0.8 V (vs Li/Li+) or less. Note that, the voltage of the secondary battery 2 may be detected on the basis of the measurement result of the voltage measuring instrument connected between the terminals of the positive and negative electrodes of the secondary battery 2, but is not limited thereto. Then, the process proceeds to step 21 (S21) if the positive determination result is obtained in step 20 (S20), and the process proceeds to step 3 (S3) if the negative determination result is obtained.

In step 3 (S3), the circuit 110 executes the first charging and discharging control, and the process ends.

According to the charging and discharging control apparatus 100 of the present embodiment, the second charging and discharging control is executed when the negative electrode potential is within a range from 0.1 V (vs Li/Li+) to 0.8 V (vs Li/Li+), in order to reduce the polarization resistance. Thereby, effects such as reduction of the capacity loss due to the internal resistance is performed.

5. Third Embodiment

Exemplary Configuration of Apparatus

Figure 7:
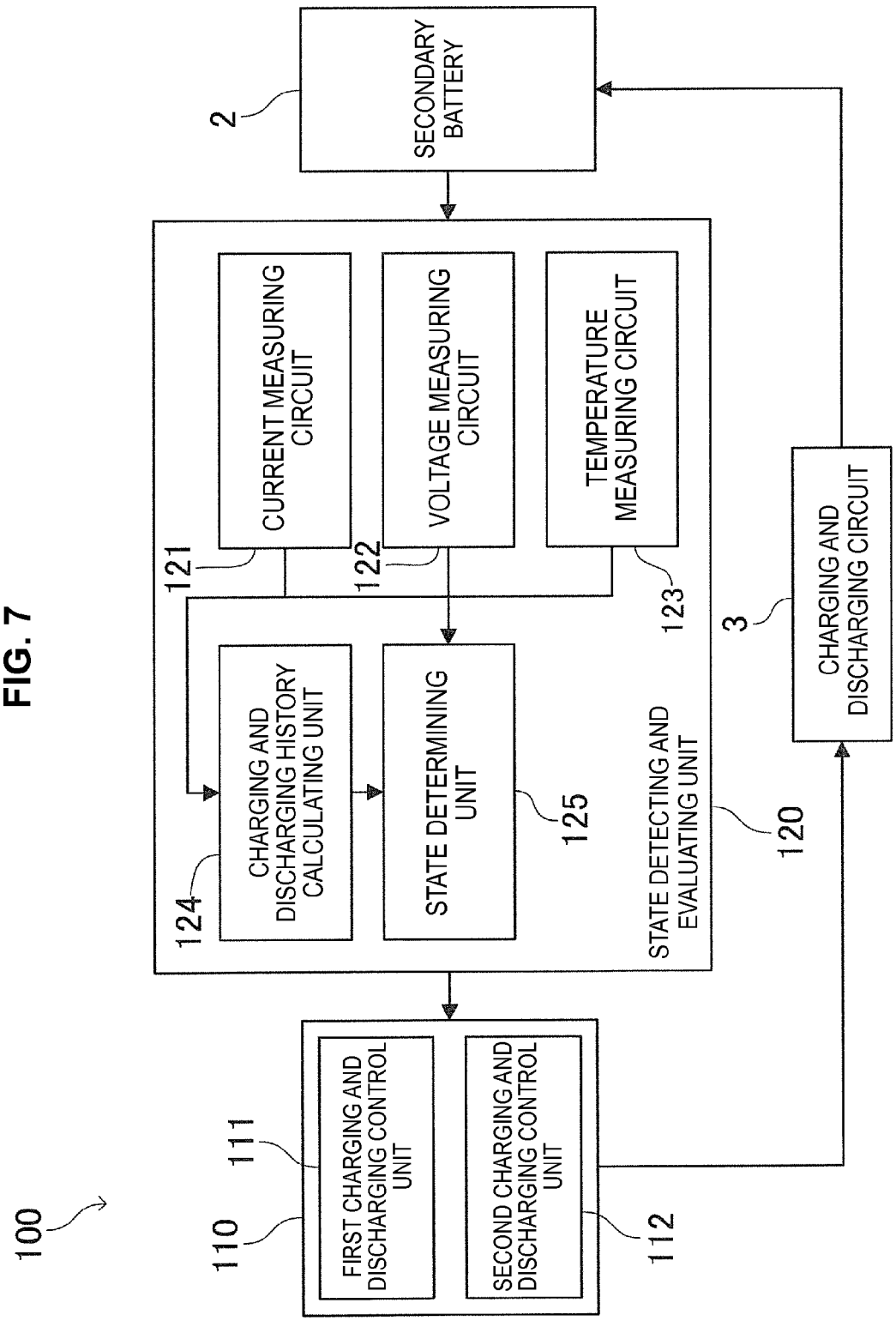
FIG. 7 is a schematic diagram illustrating an exemplary configuration of a charging and discharging control apparatus of a third embodiment of the present disclosure.

FIG. 7 is a schematic diagram illustrating the exemplary configuration of the charging and discharging control apparatus 100 of the present embodiment. The charging and discharging control apparatus 100 of the present embodiment has a more specific configuration, as compared with the charging and discharging control apparatus 100 of FIG. 4. Specifically, in the charging and discharging control apparatus 100 of the present embodiment, the circuit 110 is a component to execute the second charging and discharging control on the basis of the detection result of the state of the secondary battery 2. More specifically, in the charging and discharging control apparatus 100 of the present embodiment, the circuit 110 is a component to execute the second charging and discharging control when the detection result of the state of the secondary battery 2 including at least one of the current value, the voltage value, the temperature, the charge integrated capacity, and the discharge integrated capacity of the secondary battery 2 satisfies a specific condition.

As illustrated in FIG. 7, the charging and discharging control apparatus 100 of the present embodiment further includes a state detecting and evaluating unit 120 in addition to the configuration of FIG. 4, as one example of the specific configuration for executing the second charging and discharging control based on the detection result of the state of the secondary battery 2. The state detecting and evaluating unit 120 is a component to detect and evaluate the state of the secondary battery 2. Specifically, as illustrated in FIG. 7, the state detecting and evaluating unit 120 includes a current measuring circuit 121, a voltage measuring circuit 122, a temperature measuring circuit 123, a charging and discharging history calculating unit 124, and a state determining unit 125.

The current measuring circuit 121 is a component to measure the charge current and the discharge current of the secondary battery 2. The current measuring circuit 121 is a component to output the measurement result of the charge current and the discharge current, to the charging and discharging history calculating unit 124 and the state determining unit 125. The form of the current measuring circuit 121 is not limited specifically. For example, the current measuring circuit 121 may include a current sensor located on the power-supply line of the charging and discharging circuit 3, and an analog front end connected to the current sensor. The current measuring circuit 121 may be a component to directly measure the charge and discharge current values by an ammeter, or may be a component to indirectly measure the charge and discharge current by measuring the terminal voltage of the resistor through which the charge and discharge current flows by a voltmeter and dividing the measured voltage by a given resistance value of the resistor.

The voltage measuring circuit 122 is a component to measure the charge voltage and the discharge voltage of the secondary battery 2. The voltage measuring circuit 122 is a component to output the measurement result of the charge voltage and the discharge voltage to the charging and discharging history calculating unit 124 and the state determining unit 125. The form of the voltage measuring circuit 122 is not limited specifically. For example, the voltage measuring circuit 122 may include a voltage sensor connected in parallel with the secondary battery 2, and an analog front end connected to the voltage sensor.

The temperature measuring circuit 123 is a component to measure the temperature of the secondary battery 2. The temperature measuring circuit 123 is a component to output the measurement result of the temperature of the secondary battery 2, to the charging and discharging history calculating unit 124 and the state determining unit 125. The form of the temperature measuring circuit 123 is not limited specifically. For example, the temperature measuring circuit 123 may include a temperature sensor connected to the secondary battery 2, and an analog front end connected to the voltage sensor. The temperature sensor may be such as a thermistor.

The charging and discharging history calculating unit 124 is a component to calculate the history of the charging and discharging on the basis of the measurement result input from the measurement circuits 121 to 123. The charging and discharging history calculating unit 124 is a component to output the calculation result of the history of the charging and discharging, to the state determining unit 125. The history of the charging and discharging includes the charge integrated capacity and the discharge integrated capacity. The form of the charging and discharging history calculating unit 124 is not limited specifically. The charging and discharging history calculating unit 124 may be integrated in the circuit 110, or may be a circuit separated from the circuit 110.

The state determining unit 125 is a component to determine whether or not the state of the secondary battery 2 input from the measurement circuits 121 to 123 or the charging and discharging history calculating unit 124 satisfies a specific condition. The form of the state determining unit 125 is not limited specifically. The state determining unit 125 may be integrated in the circuit 110, or may be a circuit separated from the circuit 110.

The form of the specific condition is not limited specifically, as long as it is a condition triggering the second charging and discharging control. For example, the specific condition may be either one of items a and b below. (start a new paragraph) a. the fact that the sum of the charge integrated capacity and the discharge integrated capacity of the secondary battery 2 has exceeded a threshold value by the charging and discharging under the first charging and discharging control. In this case, the threshold value may be a value indicating the charging and discharging cycle number under the first charging and discharging control has reached a specific number. The specific number may be, for example, 100 times, but is not limited thereto. The threshold value corresponding to a case in which the specific number is 100 times may be a value corresponding to, for example, 180 times the rated discharge capacity of the secondary battery 2, but is not limited thereto. (start a new paragraph) b. the fact that, during the charging and discharging under the first charging and discharging control, the internal resistance value of the secondary battery 2 calculated from the voltage change of the secondary battery 2 immediately after flowing the current load has become the reference value of the internal resistance multiplied by the threshold value. In this case, the internal resistance value may be temperature-corrected on the basis of the temperature of the secondary battery 2. The multiplication by the threshold value may be, for example, 1.1 times, but is not limited thereto.

The circuit 110 is a component to execute the first charging and discharging control by the first charging and discharging control unit 111, when the state determining unit 125 determines that the state of the secondary battery 2 does not satisfy the specific condition. Also, the circuit 110 is a component to execute the second charging and discharging control by the second charging and discharging control unit 112, when the state determining unit 125 determines that the state of the secondary battery 2 satisfies the specific condition.

[Exemplary Operation of Apparatus]

Figure 8:
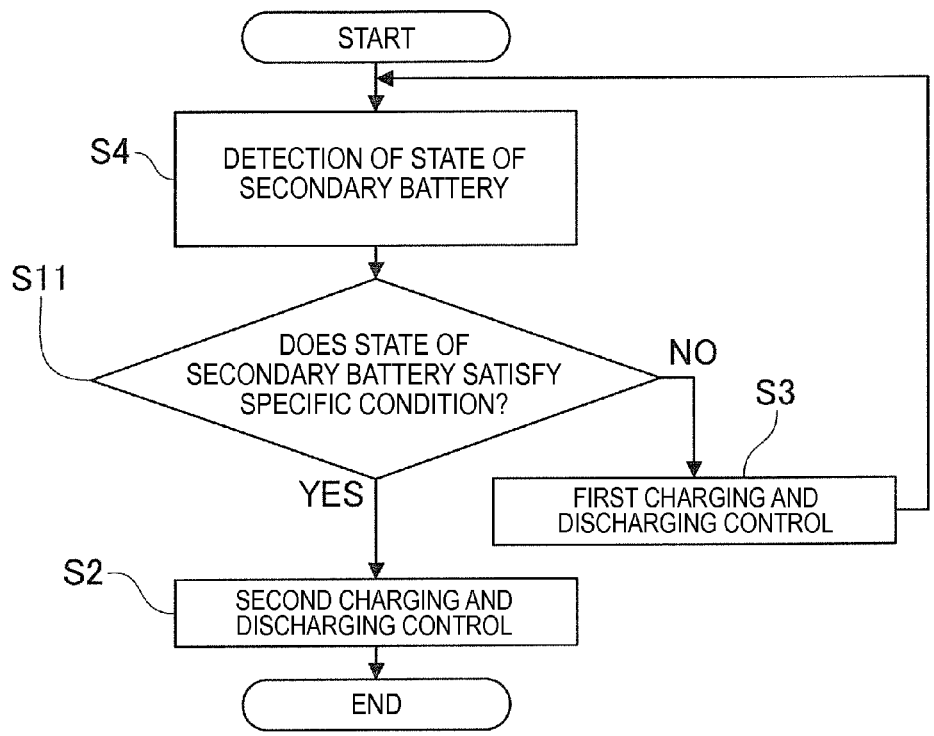
FIG. 8 is a flowchart illustrating an exemplary operation of a charging and discharging control apparatus of a third embodiment of the present disclosure.

FIG. 8 is a flowchart illustrating the exemplary operation of the charging and discharging control apparatus 100 of the present embodiment. The exemplary operation illustrated in FIG. 8 is an embodiment of the charging and discharging control method according to the present disclosure. As illustrated in FIG. 8, in the present embodiment, step 11 (S11) is executed as a specific example of step 1 (Si) described in FIG. 2. Also, step 4 (S4) is executed as the process preceding step 11 (S11). Further, step 2 (S2) described in FIG. 2 or step 3 (S3) described in FIG. 6 is executed after step 11 (S11).

Specifically, in step 4 (S4), the state of the secondary battery 2 is detected by the measurement circuits 121 to 123 and the charging and discharging history calculating unit 124.

In step 11 (S11), the circuit 110 determines whether or not the state of the secondary battery 2 detected in step 4 (S4) satisfies a specific condition. Then, the process proceeds to step 2 (S2) if the determination result of step 11 (S11) is positive, and the process proceeds to step 3 (S3) if the determination result of step 11 (S11) is negative.

According to the present embodiment, the same effect as the first embodiment is performed, or the second charging and discharging control is performed in response to the state of the secondary battery 2 in order to reduce the time during which the second charging and discharging control interrupts the first charging and discharging control as much as possible. When the first charging and discharging control is the normal charging and discharging control, the normal charging and discharging is prevented from being frequently interrupted by the second charging and discharging control.

The specific conditions presented at the above items a and b are conditions which establishes the presumption that the internal resistance is sufficiently increased by the repetition of the normal charging and discharging. Thereby, by employing such specific conditions, the smoothness of the normal charging and discharging and the improvement of the cycle characteristics are preferably balanced.

6. First Variant Example of Third Embodiment

Figure 9:
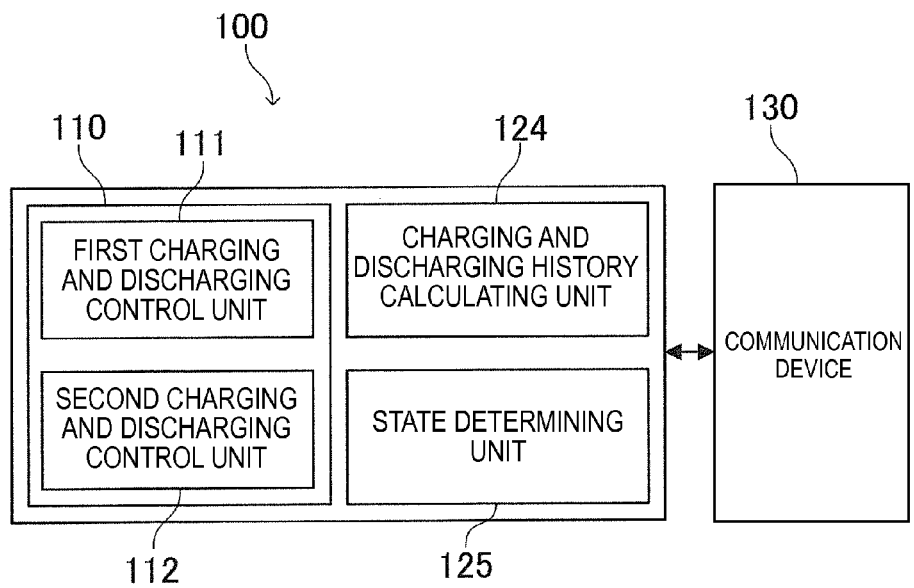
FIG. 9 is a schematic diagram illustrating an exemplary configuration of a charging and discharging control apparatus of a first variant example of a third embodiment of the present disclosure.

FIG. 9 is a schematic diagram illustrating the exemplary configuration of the charging and discharging control apparatus 100 of the present variant example. The charging and discharging control apparatus 100 of the present variant example is different from the charging and discharging control apparatus 100 of FIG. 7, in that the charging and discharging control apparatus 100 acquires the measurement result of the state of the secondary battery 2 by communication.

Specifically, as illustrated in FIG. 9, the charging and discharging control apparatus 100 of the present variant example includes a circuit 110, a charging and discharging history calculating unit 124, a state determining unit 125, and a communication device 130.

The charging and discharging history calculating unit 124 and the state determining unit 125 is a component to receive current information, voltage information and temperature information of the secondary battery 2, via the communication device 130 by communication. The charging and discharging history calculating unit 124 is a component to calculate the charge integrated capacity and the discharge integrated capacity on the basis of the received information. The state determining unit 125 is a component to determine the state of the secondary battery 2 on the basis of the received information. Although not depicted, the measurement circuits 121 to 123 (refer to FIG. 7) may be connected to a communication device to transmit the measurement result of the measurement circuits 121 to 123 toward the communication device 130. Also, the charging and discharging circuit 3 (refer to FIG. 7) may also be connected to the communication device configured to receive the control signal of the charging and discharging control apparatus 100.

The charging and discharging control apparatus 100 may be present at a position isolated from the components 3, 121 to 123 on the side of the secondary battery 2 (refer to FIG. 7). The charging and discharging control apparatus 100 may be connected to the components 3, 121 to 123 on the side of the secondary battery 2 in a communicable manner via a network. The network may be an external network or the like. The external network may be the Internet or the like. The charging and discharging control apparatus 100 may be a server or the like on the Internet. The reception form of the information of the secondary battery 2 by the charging and discharging control apparatus 100 is not limited, but is within the scope of the present disclosure regardless of which route the information of the secondary battery 2 tracks to be received by the charging and discharging control apparatus 100. The form of the communication method etc of the communication device 130 is not limited specifically either.

According to the charging and discharging control apparatus 100 of the present variant example, the same effect as the charging and discharging control apparatus 100 of FIG. 7 is performed. In addition, the charging and discharging of the secondary batteries 2 present at a plurality of locations can be controlled by the single charging and discharging control apparatus 100.

7. Fourth Embodiment

The charging and discharging control apparatus 100 of the present embodiment has a more specific content of the second charging and discharging control, i.e. a control to set the temporal change of the charging rate at or below 1%/h, as compared with the charging and discharging control apparatus 100 of the second embodiment.

Figure 10:
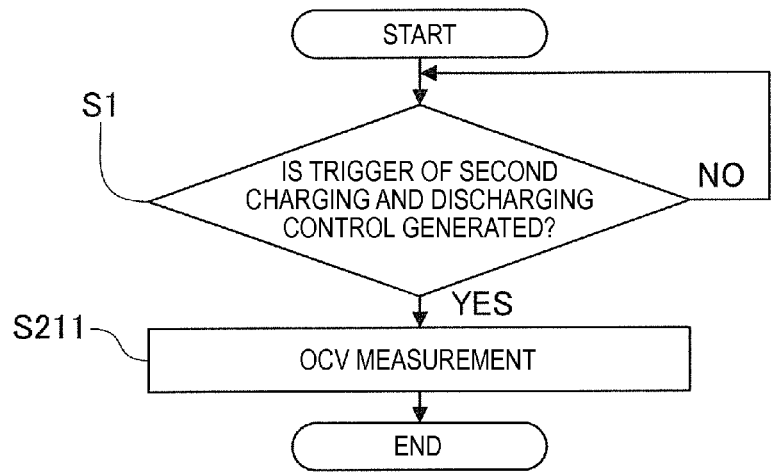
FIG. 10 is a flowchart illustrating an exemplary operation of a charging and discharging control apparatus of a fourth embodiment of the present disclosure.

Specifically, as illustrated in the flowchart of FIG. 10, in the present embodiment, step 211 (S211) is executed as a specific example of step 21 of FIG. 5. In step 211 (S211), the OCV measurement of the secondary battery 2 is conducted. During the OCV measurement, the electrical path connecting the secondary battery 2 and the load is intermittently opened to stop the discharging intermittently, in order to suppress the reduction of the charging rate, i.e. the temporal change.

According to the charging and discharging control apparatus 100 of the present embodiment, the same effect as the second embodiment is performed, or the second charging and discharging control is conducted in a simple manner.

WORKING EXAMPLE

Working Example 1

In the present working example, the charging and discharging control test was conducted on the lithium-ion secondary battery fabricated by the manufacturing method of the secondary battery described above, as a specimen. Note that the lithium-ion secondary battery was a polymer cell with a negative electrode which includes 10 wt % of a Si based active material, and an aqueous binder.

In the present working example, a negative electrode composed of 10 parts by weight of Si, 80.5 parts by weight of Gr, 1.5 part by weight of carboxymethylcellulose, 2 parts by weight of styrene-butadiene rubber, 2 parts by weight of polyvinylidene fluoride, and 4 parts by weight of a conductive additive was used as the negative electrode. Also, a positive electrode composed of 98 parts by weight of lithium cobalt oxide, 1.2 part by weight of polyvinylidene fluoride, and 0.8 part by weight of a conductive additive was used as the positive electrode. In the present working example, the charging and discharging control test was conducted with the lithium-ion secondary battery fabricated by the manufacturing method of the secondary battery described above using these negative electrode and the positive electrode, as a specimen.

In the charging and discharging control test of the present working example, the normal charging and discharging control was conducted as the first charging and discharging control. The condition of the normal charging and discharging control was as follows.

Charge: 0.5C, CCCV, 4.35V/0.025C cut
Discharge: 0.5C, 3V cut
Pause: 5 minutes after discharge and after charging, respectively
200 consecutive cycles Also, in the charging and discharging control test of the present working example, the OCV measurement was conducted as the second charging and discharging control. Note that the specific condition that the detection result of the state of the lithium-ion secondary battery should satisfy for conducting the second charging and discharging control was detection of the state of the lithium-ion secondary battery indicating that the charging and discharging by the normal charging and discharging control had completed 100 cycles. Specifically, the specific condition was that the sum of the charge integrated capacity and the discharge integrated capacity of the lithium-ion secondary battery exceeds 180 times the rated discharge capacity of the lithium-ion secondary battery.

Also, the condition of the OCV measurement as the second charging and discharging control was as follows.

Charge: 0.5C, CCCV, 4.35V/0.025C cut
Discharge: 0.1C, (CC 6 minutes/3.0V cut, pause 60 minutes)×100 times In other words, the charging was same as the normal charging and discharging control, and the discharging was conducted in accordance with intermittent discharging in which discharging and 60 minutes of pause was repeated by 1% of the SOC in order to set the change of the SOC at 1%/h. One cycle of the OCV measurement was followed by the charging and discharging by the normal charging and discharging control.

Also, as the charging and discharging control test of the comparative example, the test only by the normal charging and discharging control was conducted to a lithium-ion secondary battery that is same as the specimen described above.

The test results of the charging and discharging control tests of the working example and the comparative example are shown in table 1.

|  | Capacity Retention Ratio after 200 cycles (%) |
|---|---|
| Working Example | 69.1 |
| Comparative Example | 58.5 |

Here, table 1 shows the capacity retention ratios after 200 cycles from the test start, with respect to each of the charging and discharging control tests of the working example and the comparative example.

Figure 11:
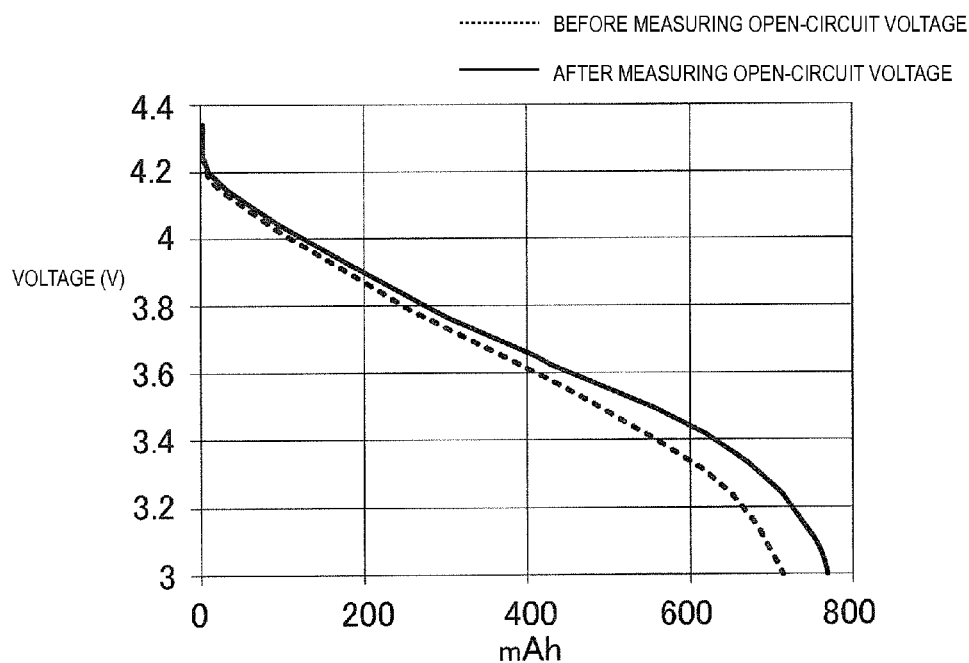
FIG. 11 is a graph for describing a working example of a charging and discharging control apparatus of a fourth embodiment of the present disclosure.

Also, when the charging and discharging control test of the working example was conducted, respective 0.5C load curves before and after the OCV measurement were obtained. These are illustrated in FIG. 11.

According to the charging and discharging control test of the working example, it was confirmed that the drop of the capacity retention ratio was suppressed at or after one-hundredth cycle of the intermittent discharging by the OCV measurement, as compared with the charging and discharging control test of the comparative example. In other words, according to the present working example, it was confirmed that, by conducting the OCV measurement on the normally charged and discharged lithium-ion secondary battery, the subsequent cycle characteristics in the normal charging and discharging were improved.

Specifically, as shown in table 1, in the case of the charging and discharging control test of the comparative example, the capacity retention ratio after 200 cycles from the test start was 58.5%, whereas in the case of the charging and discharging control test of the working example, the capacity retention ratio after 200 cycles from the test start was improved to 69.1%.

The capacity retention ratio at 0.2C and at 200 cycles of the working example and the comparative example were 71.3% and 69.1%, respectively. Since the difference is as small as 2.2% as compared with the difference of the capacity retention ratio of 0.5C, it is presumed that the improvement of the cycle characteristics by the charging and discharging control test of the working example is attributed to the reduction of the internal resistance.

Also, as illustrated in FIG. 11, after the OCV measurement, the drop of the overvoltage, particularly the capacity recovery at or below 3.7 V was confirmed.

Experimental Example 2

In the present experimental example, a negative electrode composed of 10 parts by weight of Si, 81 parts by weight of Gr, 6 parts by weight of polyvinylidene fluoride, and 3 parts by weight of a conductive additive was used as the negative electrode. Also, a positive electrode composed of 98 parts by weight of lithium cobalt oxide, 1.2 part by weight of polyvinylidene fluoride, 0.8 part by weight of a conductive additive was used as the positive electrode. In the present working example, the charging and discharging control test was conducted to the lithium-ion secondary battery fabricated by the manufacturing method of the secondary battery described above using these negative electrode and the positive electrode, as a specimen.

The charging and discharging control test of the present working example was conducted in the following charging and discharging condition.

Charge: 0.5C, CCCV, 4.35V/0.025C cut
Discharge: 0.5C, 2.5V cut
Pause: 5 minutes after charge and after discharge, respectively
25 consecutive cycles The OCV measurement was conducted at every 25 cycles, and the cycle was conducted up to 100 cycles.

In the charging and discharging control test of the comparative example, consecutive cycles were conducted without the OCV measurement.

The test results of the charging and discharging control tests of the working example and the comparative example are shown in table 2.

|  | Capacity Retention Ratio after 100 cycles (%) |
|---|---|
| Working Example | 75.59 |
| Comparative Example | 74.15 |

As illustrated in table 2, in the case of the charging and discharging control test of the comparative example, the capacity retention ratio after 100 cycles from the test start was 74.15%, whereas in the case of the charging and discharging control test of the working example, the capacity retention ratio after 100 cycles from the test start was improved to 75.59%.

Experimental Example 3

In the present experimental example, a negative electrode composed of 15 parts by weight of Si, 76 parts by weight of Gr, 1 part by weight of carboxymethylcellulose, 2 parts by weight of styrene-butadiene rubber, 2 parts by weight of polyvinylidene fluoride, and 4 parts by weight of a conductive additive was used as the negative electrode. Also, a positive electrode composed of 98 parts by weight of a lithium cobalt oxide, 1.2 part by weight of polyvinylidene fluoride, and 0.8 part by weight of a conductive additive was used as the positive electrode. In the present working example, the charging and discharging control test was conducted to the lithium-ion secondary battery fabricated by the manufacturing method of the secondary battery described above using these negative electrode and the positive electrode, as a specimen.

The charging and discharging conditions in the charging and discharging control test of the present working example and the charging and discharging control test of the comparative example are same as the working example 2. The test result is shown in table 3.

|  | Capacity Retention Ratio after 100 cycles (%) |
|---|---|
| Working Example | 68.21 |
| Comparative Example | 65.24 |

As illustrated in table 3, in the case of the charging and discharging control test of the comparative example, the capacity retention ratio after 100 cycles from the test start was 65.24%, whereas in the case of the charging and discharging control test of the working example, the capacity retention ratio after 100 cycles from the test start was improved to 68.21%.

8. Fifth Embodiment

Figure 12:
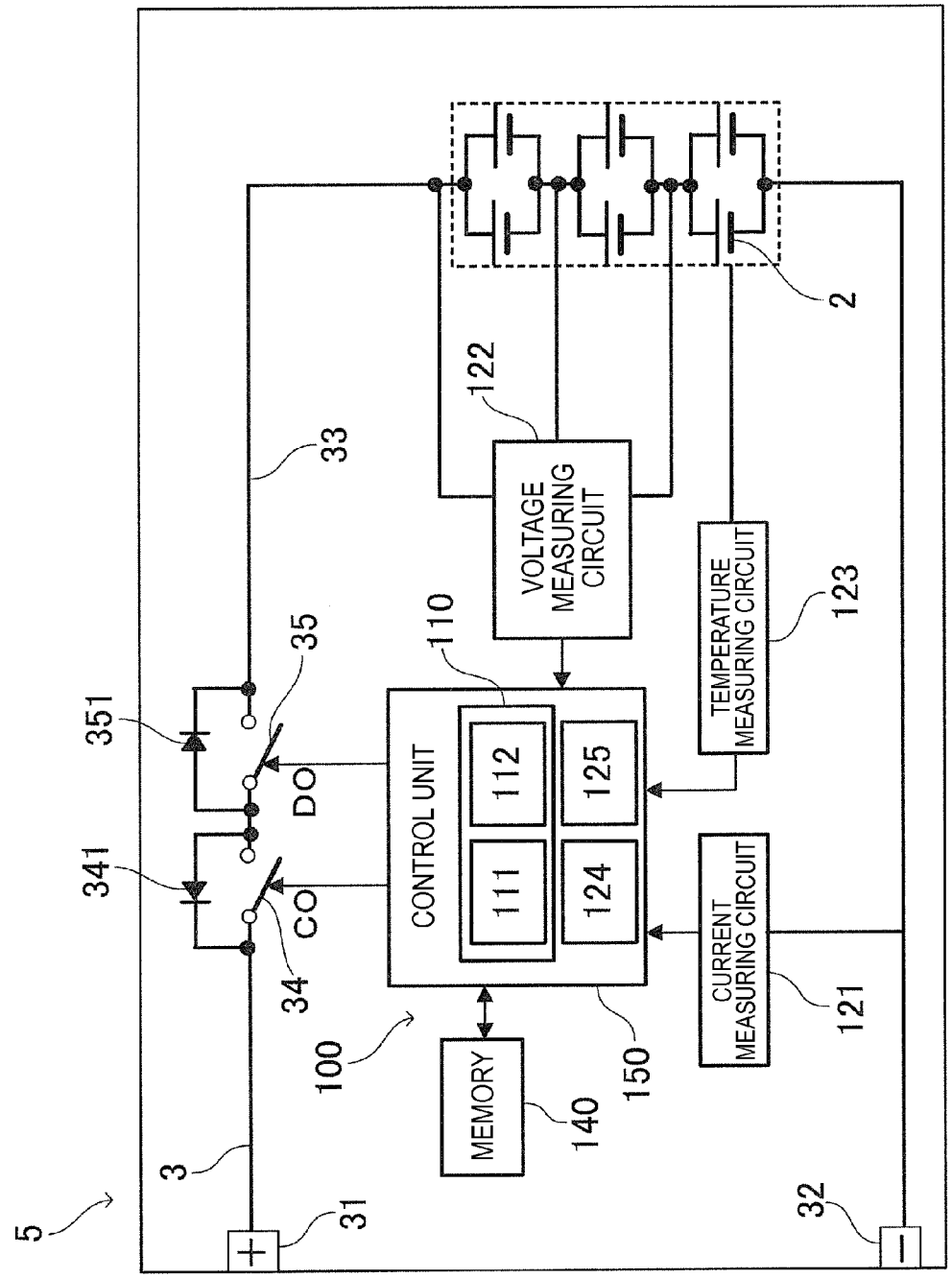
FIG. 12 is a schematic diagram illustrating an exemplary configuration of a battery pack of an embodiment of the present disclosure.

FIG. 12 is a block diagram illustrating an exemplary circuit configuration when the charging and discharging control apparatus 100 of FIG. 7 is applied to a battery pack 5. The battery pack 5 includes the charging and discharging control apparatus 100, the secondary battery 2, and the charging and discharging circuit 3.

The charging and discharging control apparatus 100 includes the circuit 110, the charging and discharging history calculating unit 124, and the state determining unit 125, which are integrated in the control unit 150. Also, the charging and discharging control apparatus 100 has a memory 140. This memory 140 is configured by a RAM and a ROM, and may be configured by an EPROM (Erasable Programmable Read Only Memory) or the like, which is a non-volatile memory, for example. Programs, data, and the like for causing the control unit 150 to execute the function as the charging and discharging control apparatus 100 are stored in the memory 140. In addition, in the memory 140, numerical values computed in the control unit 150, the internal resistance value in the initial state of the secondary battery 2 which is measured in the step of the manufacturing process, and the like may be stored in advance, or may be rewritable as appropriate. Also, in the memory 140, a full charge capacity of the secondary battery 2 may be stored. The control unit 150 may calculate the remaining capacity of the secondary battery 2 on the basis of the full charge capacity.

In the configuration of FIG. 12, a plurality of secondary batteries 2 are located. Specifically, in the configuration of FIG. 12, a plurality of parallel connection blocks of the secondary battery 2 are connected in series. Note that the form of the connection of each secondary battery 2 is not limited to the form illustrated in FIG. 12.

The charging and discharging circuit 3 includes a positive electrode terminal 31, a negative electrode terminal 32, a power-supply line 33 arranged between the both electrode terminals, a charge control switch 34 and a discharge control switch 35 located on the power-supply line 33, and diodes 341, 351 connected in parallel with respective switches 34, 35.

When charging, the positive electrode terminal 31 is connected to the positive electrode terminal of a charger, and the negative electrode terminal 32 is connected to the negative electrode terminal of the charger, in order to conduct the charging. Also, when discharging, the positive electrode terminal 31 is connected to the positive electrode terminal of the load, and the negative electrode terminal 32 is connected to the negative electrode terminal of the load, in order to conduct the discharging.

The diode 341 connected in parallel with the charge control switch 34 has a polarity of the opposite direction to the charge current flowing in the direction from the positive electrode terminal 31 to the secondary battery 2, as well as of the forward direction of the discharge current flowing in the direction from the negative electrode terminal 32 to the secondary battery 2. On the other hand, the diode 351 connected in parallel with the discharge control switch 35 has a polarity of the forward direction of the charge current, as well as of the opposite direction to the discharge current. Although in the configuration of FIG. 12, the switches 34, 35 are provided on the plus side, the switches 34, 35 may be provided on the minus side.

The charge control switch 34 is controlled in an ON state or in an OFF state, on the basis of the charge control signal CO from the control unit 150. In the OFF state of the charge control switch 34, only discharging can be conducted via the diode 341.

The discharge control switch 35 is controlled in the ON state or in the OFF state, on the basis of the discharge control signal DO from the control unit 150. In the OFF state of the discharge control switch 35, only charging can be conducted via the diode 351.

The charge control switch 34 and the discharge control switch 35 are turned on and off by the first charging and discharging control and the second charging and discharging control by the circuit 110. In addition, the charge control switch 34 may be turned off, when the battery voltage becomes an overcharge detection voltage. Also, the charge control switch 34 may be turned off, when a large current flows during charging. Also, the discharge control switch 35 may be turned off, when the battery voltage becomes an overdischarge detection voltage. Also, the discharge control switch 35 may be turned off, when a large current flows during discharging.

A semiconductor switch such as a MOSFET may be used as the charge control switch 34 and the discharge control switch 35, for example. In this case, the diodes 341, 351 may be the parasitic diode of the MOSFET. When a P-channel FET is used as the switches 34, 35, the control unit 150 may supply the control signals CO, DO to the gates of the switches 34, 35. Also, the switches 34, 35 may be turned on by a gate potential lower than a source potential by a predetermined value or more. In other words, in the normal charging and discharging operation, the control signals CO, DO may be set at a low level. In addition, at the time of overcharge or overdischarge for example, the control signals CO, DO may be set at a high level, to turn the switches 34, 35 to the OFF state.

Also, the control unit 150 may conduct the charging and discharging control when abnormal heat is generated, and may conduct a correction in the calculation of the remaining capacity, on the basis of the detected temperature of the secondary battery 2.

According to the present embodiment, with the charging and discharging control apparatus 100, a battery pack that improves the cycle characteristics while securing the volume energy density is realized.

9. Sixth Embodiment

Figure 13:
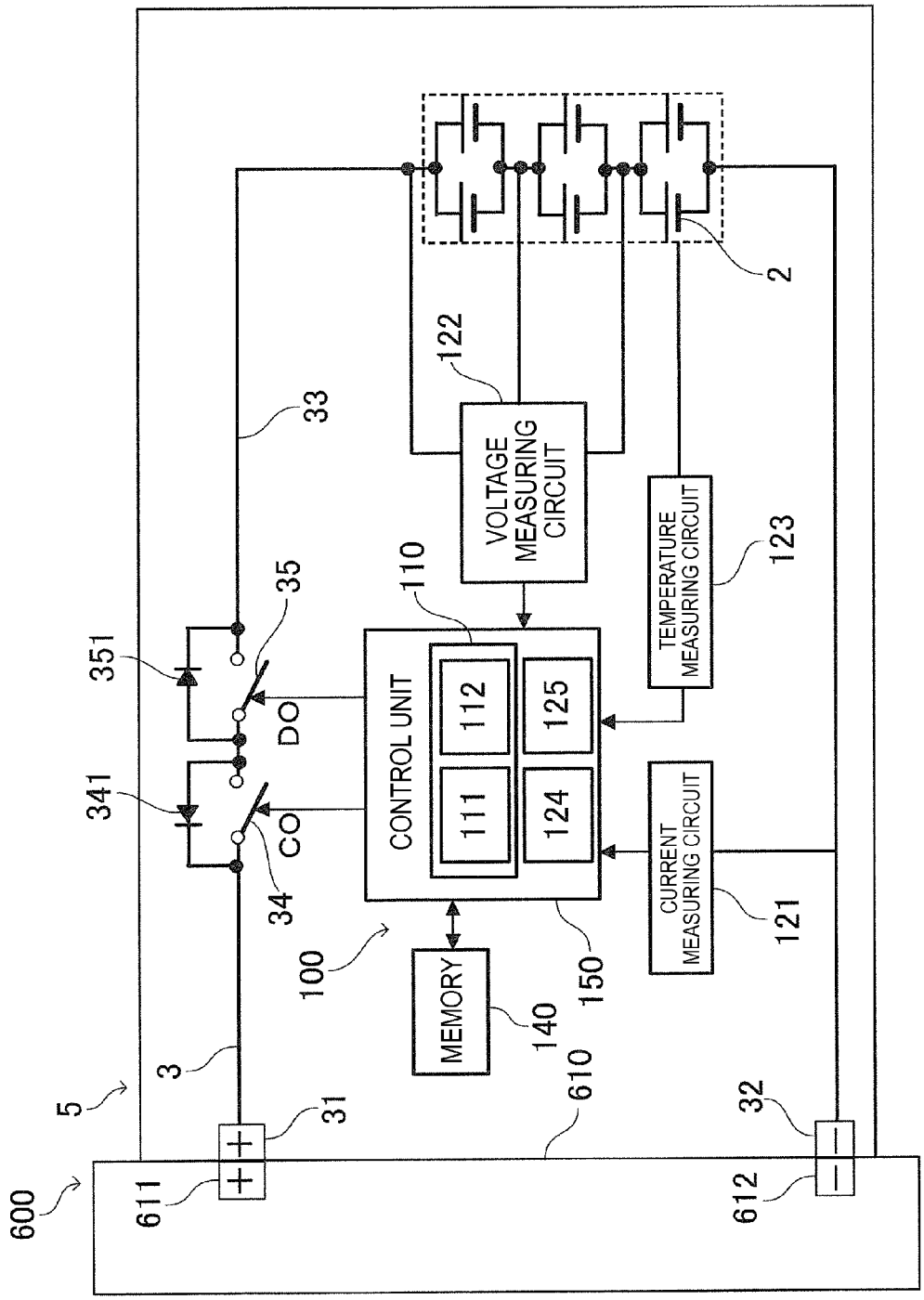
FIG. 13 is a schematic diagram illustrating an exemplary configuration of an electronic device of an embodiment of the present disclosure.

FIG. 13 is a block diagram illustrating an exemplary configuration when the charging and discharging control apparatus 100 of FIG. 7 is applied to the electronic device 600. The electronic device 600 includes the battery pack 5 described in FIG. 12, and a device main body 610. In the device main body 610, the positive electrode terminal 611 is connected to the positive electrode terminal 31 of the battery pack 5, and the negative electrode terminal 612 is connected to the negative electrode terminal 32 of the battery pack 5, in order to conduct discharging from the battery pack 5. The form of the device main body 610 is not limited specifically. For example, the device main body 610 may be such as a notebook personal computer, a PDA (personal digital assistance), a portable phone, a cordless phone handset, a video movie, a digital still camera, an electronic book, an electronic dictionary, a music player, a radio, a headphone, a game machine, a navigation system, a memory card, a pacemaker, a hearing aid, an electric tool, an electric shaver, a refrigerator, an air conditioner, a television, a stereo, a water heater, a microwave, a dishwasher, a washing machine, a dryer, a lighting equipment, a toy, a medical equipment, a robot, a load conditioner, and a signal.

According to the present embodiment, with the charging and discharging control apparatus 100, an electronic device that improves the cycle characteristics while securing the volume energy density is realized.

10. Seventh Embodiment

Figure 14:
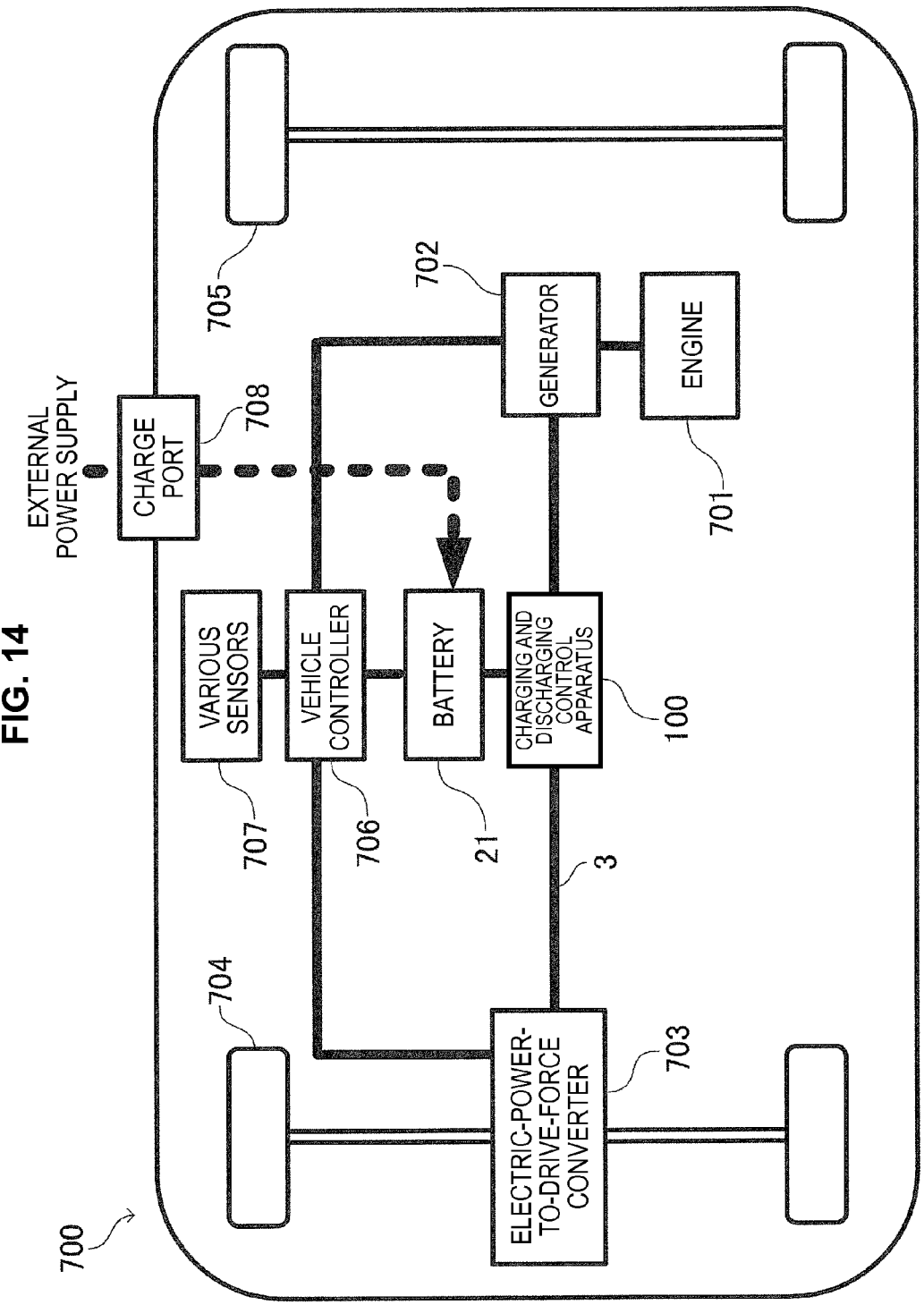
FIG. 14 is a schematic diagram illustrating an exemplary configuration of an electric vehicle of an embodiment of the present disclosure.

FIG. 14 schematically illustrates an example of the configuration of the hybrid vehicle 700 to which the charging and discharging control apparatus of an embodiment of the present disclosure 100 is applied. The hybrid vehicle 700 is an embodiment of an electric vehicle of the present disclosure. The hybrid vehicle 700 employs the series hybrid system. The series hybrid system is a vehicle that runs by an electric-power-to-drive-force converter using the electric power generated by a generator that is driven by an engine. The hybrid vehicle 700 includes an engine 701, a generator 702, an electric-power-to-drive-force converter 703, a drive wheel 704, a wheel 705, a battery 21, a vehicle controller 706, various types of sensors 707, a charge port 708, the charging and discharging control apparatus 100, and the charging and discharging circuit 3. The battery 21 is one form of the secondary battery 2.

The hybrid vehicle 700 travels with the electric-power-to-drive-force converter 703 as the power source. The electric-power-to-drive-force converter 703 may be a motor for example. The electric power stored in the battery 21 is discharged via the charging and discharging circuit 3 to the electric-power-to-drive-force converter 703, in order to operate the electric-power-to-drive-force converter 703. Then, the torque of the electric-power-to-drive-force converter 703 is transmitted to the drive wheel 704. Note that both of an AC motor and a DC motor are applicable as the electric-power-to-drive-force converter 703. The various types of sensors 707 controls, through the vehicle controller 706, the engine speed and the opening degree of the throttle valve which is not depicted, i.e. the throttle opening degree. The various types of sensors 707 may include a speed sensor, an acceleration sensor, an engine speed sensor, and others.

The hybrid vehicle 700 is capable of storing, in the battery 21, the electric power generated by the generator 702 to which the torque of the engine 701 is transmitted. Also, when the hybrid vehicle 700 is decelerated by the braking mechanism not depicted, the resisting force during the deceleration is transmitted to the electric-power-to-drive-force converter 703 as the torque, so that the regenerated electric power generated by the electric-power-to-drive-force converter 703 from the torque is stored in the battery 21. Further, the battery 21 can be connected to a power supply outside the hybrid vehicle 700 via the charging and discharging circuit 3, so that the electric power supplied from the power supply through the charge port 708 as an input port is stored.

Although not depicted, there may be provided an information processing apparatus configured to execute information processing relevant to the vehicle control on the basis of the information relevant to the secondary battery 2. This information processing apparatus is, for example, an information processing apparatus that displays the battery remaining amount on the basis of the information on the remaining amount of the battery, or the like.

Note that the electric vehicle of an embodiment of the present disclosure is also effectively applicable to a parallel hybrid vehicle that uses both outputs of the engine and the motor as the drive source and switches as appropriate between three modes: travel on the engine only, travel on the motor only, and travel on the engine and the motor. Further the electric vehicle of an embodiment of the present disclosure is also effectively applicable to a vehicle that travels driven only by the driving motor without using the engine.

According to the present embodiment, with the charging and discharging control apparatus 100, an electric vehicle that improves the cycle characteristics while securing the volume energy density is realized.

11. Eighth Embodiment

Figure 15:
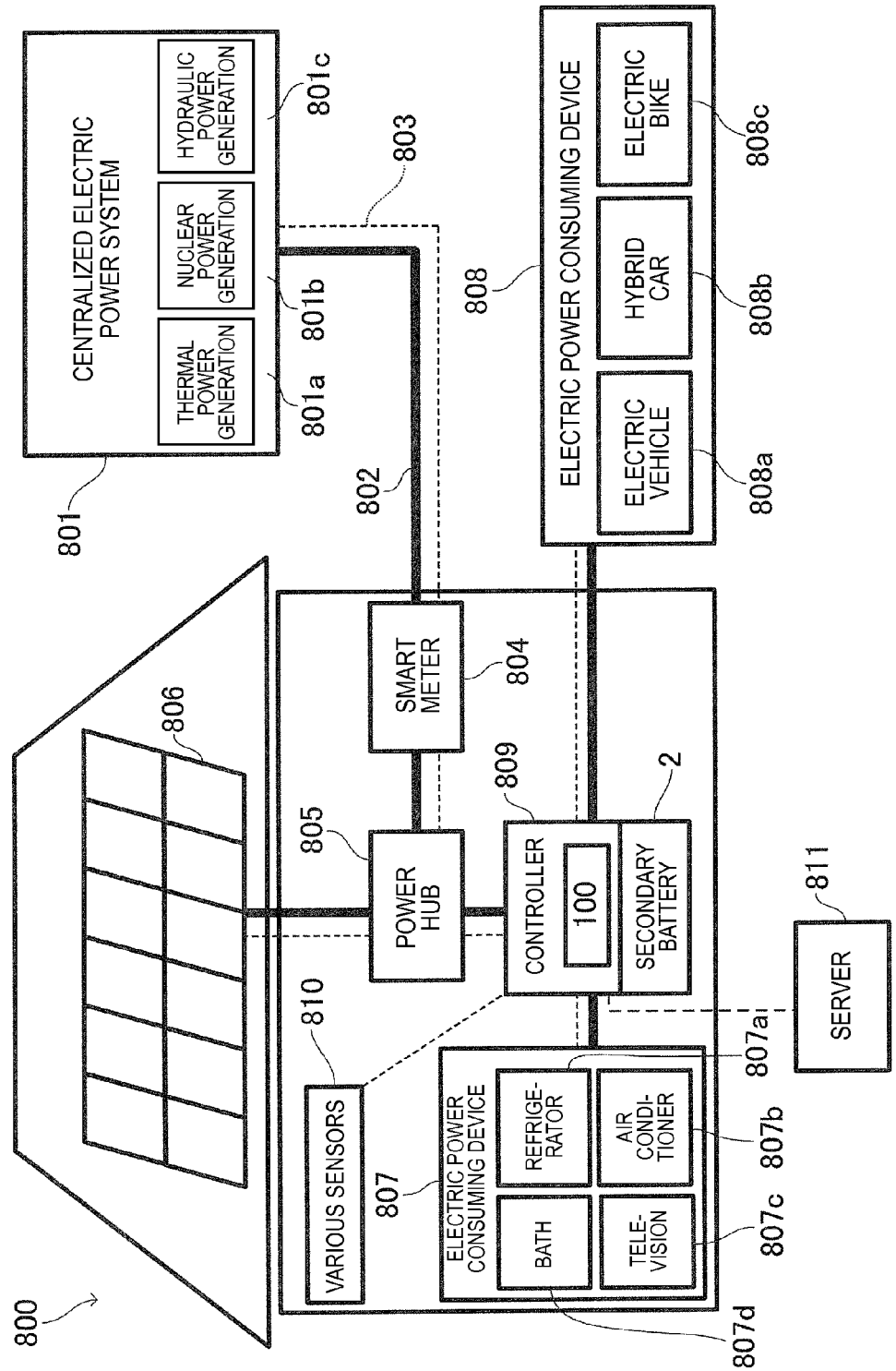
FIG. 15 is a schematic diagram illustrating an exemplary configuration of a charging and discharging control apparatus of an embodiment of the present disclosure, which is applied to an electricity storage system.
Figure 16:
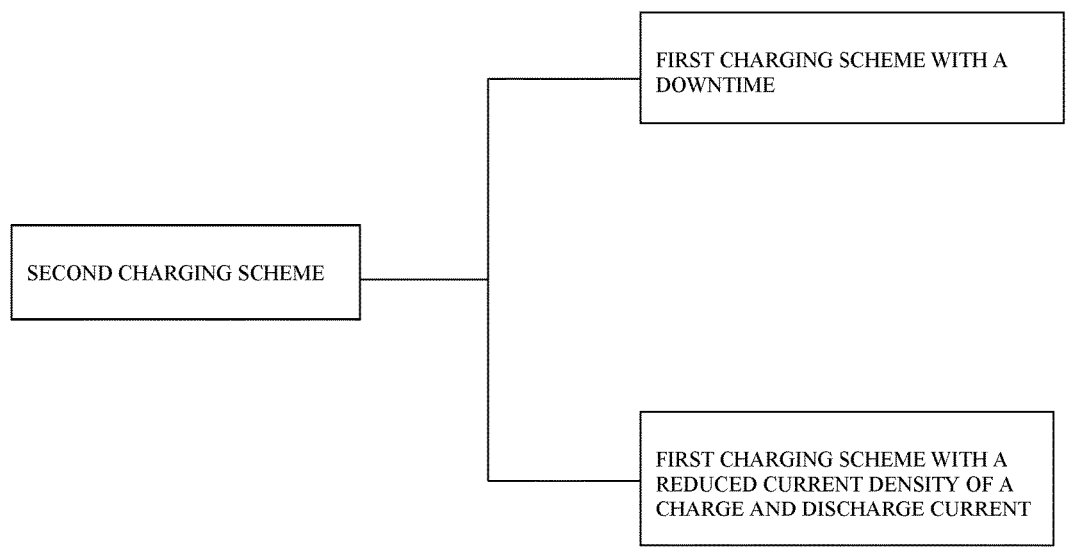
FIG. 16 is a schematic diagram illustrating an exemplary configuration of a second charging scheme of a first embodiment of the present disclosure.

FIG. 15 illustrates an exemplary configuration of the electricity storage system 800 to which the charging and discharging control apparatus 100 of an embodiment of the present disclosure is applied. The electricity storage system 800 is applied to buildings such as a residential house and a commercial building, for example.

As illustrated in FIG. 15, in the electricity storage system 800, the electric power is supplied from a centralized electric power system 801 such as thermal power generation 801a, nuclear power generation 801b, hydraulic power generation 801c, via an electric power network 802, an information network 803, a smart meter 804, a power hub 805 and others, to the secondary battery 2 and stored therein. Also, the electric power is supplied to the secondary battery 2, from the independent power supply of a home electric generator 806 as well. The electric power stored in the secondary battery 2 is supplied to indoor electric power consuming devices 807 such as a refrigerator 807a, an air conditioner 807b, a television 807c, and a bath 807d, for example. Also, the electric power of the secondary battery 2 is supplied to outdoor electric power consuming devices 808 such as an electric vehicle 808a, a hybrid car 808b, and an electric bike 808c, for example.

The electric power network 802 includes electric power lines of the charging and discharging circuit. The electric power network 802 may have a configuration for supplying the electric power by any one of or any two or more of direct current power feeding, alternate current power feeding, and wireless power feeding. The information network 803 may use any communication method such as Zigbee (registered trademark), PLC (Power Line Communications), WiFi (registered trademark), and Blue tooth (registered trademark). The smart meter 804 has a function to measure the usage amount of commercial electric power and to transmit the measured usage amount to an electric power company. The electric generator 806 may be a solar cell, a fuel cell, or the like.

Also, as illustrated in FIG. 15, the electricity storage system 800 includes a controller 809, and this controller 809 includes the charging and discharging control apparatus 100 of an embodiment of the present disclosure.

Also, as illustrated in FIG. 15, the electricity storage system 800 includes various types of sensors 810. The various types of sensors 810 may be, for example, a human-sensing sensor, an illuminance sensor, an object detecting sensor, a power consumption sensor, a vibration sensor, a contact sensor, a temperature sensor, an infrared sensor, and the like. The information acquired by the various types of sensors 810 is transmitted to the controller 809.

Also, as illustrated in FIG. 15, the electricity storage system 800 includes a server 811. The server 811 is connected to the controller 809. The server 811 may be managed by any of the residential house, the electric power company, and the service provider. The information transmitted and received by the server 811 may be, for example, power consumption information, living pattern information, electric power charge, weather information, natural disaster information, and information relevant to electricity trade, and the like. These information may be transmitted and received from the electric power consuming devices 807 inside the home (for example, the television), and may be transmitted and received from devices outside the home (for example, the portable phone and the like). These information may be displayed on devices having a display function such as, for example, the television, the portable phone, and the PDA, preferably.

The controller 809 has a function to regulate the usage amount and the generation amount of the commercial electric power, for example, in addition to the function of the charging and discharging control apparatus 100. Note that, in addition, the controller 809 may have a function to execute electric power transactions in the electric power market, and other functions.

According to the present embodiment, with the charging and discharging control apparatus 100, an electricity storage system that improves the cycle characteristics while securing the volume energy density is realized.

Each of the embodiments and the variant examples described above may be combined as appropriate. Even if a certain component in an arbitrarily-selected embodiment or variant example is incorporated in another embodiment or variant example, or is substituted for a component in another embodiment or variant example, the product is within the scope of the present disclosure.

The action and effect described in each embodiment and variant example are just an illustration and not restrictive, and other actions and effects may be performed. The present disclosure is satisfactory if it performs any one of a plurality of actions and effects described in respective embodiments and variant examples.

Additionally, the present application may also be configured as below.

(1) A charging control apparatus comprising:
a control unit configured to transmit instructions to a charging unit to execute charging of a battery,
wherein the control unit is configured to cause a scheme change from a first charging scheme to a second charging scheme based on charging scheme information received by the control unit.

(2) The charging control apparatus according to (1), wherein the charging scheme information is based on detection result of a state of the battery.

(3) The charging control apparatus according to (1) or (2), wherein the charging scheme information includes a detected negative electrode potential of the battery.

(4) The charging control apparatus according to any one of (1) to (3), wherein the charging scheme information includes at least one selected from the group consisting of a current value of the battery, a voltage value of the battery, and a temperature of the battery.

(5) The charging control apparatus according to any one of (1) to (4), wherein the charging scheme information includes open-circuit voltage measurements of the battery.

(6) The charging control apparatus according to any one of (1) to (5), wherein the second charging scheme includes utilizing the first charging scheme in an intermittent manner.

(7) The charging control apparatus according to any one of (1) to (6), wherein the second charging scheme includes modifying the first charging scheme with a reduced current density of the charge and discharge current.

(8) The charging control apparatus according to any one of (1) to (7), wherein the second charging scheme includes utilizing the first charging scheme while changing a charge voltage in a stepwise manner.

(9) The charging control apparatus according to any one of (1) to (8), further comprising a state detecting and evaluating unit connected between the battery and the control unit, the state detecting and evaluating unit configured to detect and evaluate the state of the battery.

(10) The charging control apparatus according to (9), wherein the state detecting and evaluating unit includes at least one selected from the group consisting of a current measuring unit, a voltage measuring unit, and a temperature measuring unit.

(11) The charging control apparatus according to (10), wherein the state detecting and evaluating unit further includes a charging and discharging history calculation unit.

(12) The charging control apparatus according to any one of (1) to (11), further comprising a discharging unit, wherein the control unit is also configured to transmit instructions to the discharging unit to execute discharging of the battery.

(13) A charging control apparatus comprising:
a control unit including
a first control unit configured to transmit instructions to a charging unit to execute charging of a battery, and
a second control unit configured to transmit instructions to the charging unit to execute charging of the battery with a temporal change of a charging rate being less than a temporal change of a charging rate of the first control unit.

(14) The charging control apparatus according to (13), wherein the control unit is configured to cause a scheme change from a first charging scheme of the first control unit to a second charging scheme of the second control unit based on charging scheme information received by the control unit.

(15) The charging control apparatus according to (13) or (14), further comprising a discharging unit, wherein the control unit is also configured to transmit instructions to the discharging unit to execute discharging of the battery.

(16) A battery comprising:
a battery unit; and
a control unit configured to transmit instructions to a charging unit to execute charging of the battery unit,
wherein the control unit is configured to cause a scheme change from a first charging scheme to a second charging scheme based on charging scheme information received by the control unit.

(17) The battery according to (16), further comprising a discharging unit, wherein the control unit is also configured to transmit instructions to the discharging unit to execute discharging of the battery

(18) An electronic device comprising:
a battery unit; and
a control unit configured to transmit instructions to a charging unit to execute charging of the battery unit,
wherein the control unit is configured to cause a scheme change from a first charging scheme to a second charging scheme based on charging scheme information received by the control unit.

(19) The electronic device according to (18), further comprising a discharging unit, wherein the control unit is also configured to transmit instructions to the discharging unit to execute discharging of the battery.

(20) A vehicle comprising:
a battery unit;
a control unit configured to transmit instructions to a charging unit to execute charging of the battery unit; and
a converter configured to convert electric power supplied from the battery unit to a vehicle driving force,
wherein the control unit is configured to cause a scheme change from a first charging scheme to a second charging scheme based on charging scheme information received by the control unit.

(21) The vehicle according to (20), further comprising a discharging unit, wherein the control unit is also configured to transmit instructions to the discharging unit to execute discharging of the battery.

(22) A charging control method comprising:
transmitting instructions to a charging unit to execute charging of a battery,
changing from a first charging scheme to a second charging scheme based on charging scheme information received by a control unit.

(23) The charging control method according to (22), further comprising transmitting instructions to a discharging unit to execute discharging of the battery.

(24) An electric storage system comprising:
a charging control apparatus including
a control unit configured to transmit instructions to a charging unit to execute charging of a battery;
a server connected to the charging control apparatus,
wherein the control unit is configured to cause a scheme change from a first charging scheme to a second charging scheme based on charging scheme information received by the control unit.

(25) The electric storage system according to (24), wherein the charging control apparatus is configured to regulate a usage amount and a generation amount of electric power from an external electronic power supply network.

(26) The electric storage system according to (24) or (25), wherein the server is configured to transit and receive information from at least one power consumption device that is connected to the charging control apparatus.

(27) A charging control unit configured to transmit instructions to a charging unit to execute charging of a battery,
wherein the charging control unit is configured to cause a scheme change from a first charging scheme to a second charging scheme based on charging scheme information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control apparatus comprising:
    a control unit configured to transmit instructions to a charging and discharging circuit to execute charging and discharging of a battery, and the battery is charged and discharged by the charging and discharging circuit according to the instructions,
    wherein the control unit is configured to cause a scheme change from a first scheme having a first charging rate and a first discharging rate to a second scheme having a second charging rate and a second discharging rate based on scheme information received by the control unit,
    wherein the first charging rate is same as the second charging rate and the second discharging rate is smaller than the first discharging rate, and
    wherein the control unit sets the second discharging rate in the second scheme at or below 1%/hour of change of state of charge when a negative electrode potential of the battery is from 0.1 V to 0.8V.

2. The control apparatus according to claim 1, wherein the scheme information is based on detection result of a state of the battery.

3. The control apparatus according to claim 1, wherein the scheme information includes a detected negative electrode potential of the battery.

4. The control apparatus according to claim 1, wherein the scheme information includes at least one selected from the group consisting of a current value of the battery, a voltage value of the battery, and a temperature of the battery.

5. The control apparatus according to claim 1, wherein the scheme information includes open-circuit voltage of the battery.

6. The control apparatus according to claim 1, wherein the control unit is also configured to transmit instructions to the charging and discharging circuit to execute discharging of the battery.

7. The control apparatus according to claim 1, wherein the second scheme includes a form of utilizing the first scheme with a small changing of a charge voltage.

8. The control apparatus according to claim 1, further comprising a state detecting and evaluating unit connected between the battery and the control unit, the state detecting and evaluating unit configured to detect and evaluate the state of the battery.

9. The control apparatus according to claim 8, wherein the state detecting and evaluating unit includes at least one selected from the group consisting of a current measuring unit, a voltage measuring unit, and a temperature measuring unit.

10. The control apparatus according to claim 9, wherein the state detecting and evaluating unit further includes a charging and discharging history calculation unit.

11. A control apparatus comprising:
    a control unit including
        a first control unit configured to transmit instructions to a charging and discharging circuit to execute charging and discharging of a battery under a first charging scheme having a first charging rate and a first discharging rate, the battery is charged and discharged by the charging and discharging circuit according to the instructions, and
        a second control unit configured to transmit instructions to the charging and discharging circuit to execute charging and discharging of the battery under a second scheme having a second charging rate and a second discharging rate,
    wherein the first charging rate is same as the second charging rate and the second discharging rate is smaller than the first discharging rate, and
    wherein the control unit sets the second discharging rate in the second scheme at or below 1%/hour of change of state of charge when a negative electrode potential of the battery is from 0.1 V to 0.8V.

12. The control apparatus according to claim 11, wherein the control unit is configured to cause a scheme change from the first scheme of the first control unit to the second scheme of the second control unit based on scheme information received by the control unit.

13. The control apparatus according to claim 11, wherein the control unit is also configured to transmit instructions to the charging and discharging circuit to execute discharging of the battery.

14. A battery comprising:
    a battery unit; and
    a control unit configured to transmit instructions to a charging and discharging circuit to execute charging and discharging of the battery unit, the battery unit is charged by the charging and discharging circuit according to the instructions,
    wherein the control unit is configured to cause a scheme change from a first scheme having a first charging rate and a first discharging rate to a second scheme having a second charging rate and a second discharging rate based on scheme information received by the control unit,
    wherein the first charging rate is same as the second charging rate and the second discharging rate is smaller than the first discharging rate, and
    wherein the control unit sets the second discharging rate in the second scheme at or below 1%/hour of change of state of charge when a negative electrode potential of the battery unit is from 0.1 V to 0.8V.

15. The battery according to claim 14, wherein the control unit is also configured to transmit instructions to the charging and discharging circuit to execute discharging of the battery unit.

16. An electronic device comprising:
    a battery unit; and
    a control unit configured to transmit instructions to a charging and discharging circuit to execute charging and discharging of the battery unit, the battery unit is charged and discharged by the charging and discharging circuit according to the instructions,
    wherein the control unit is configured to cause a scheme change from a first scheme having a first charging rate and a first discharging rate to a second scheme having a second charging rate and a second discharging rate based on scheme information received by the control unit, wherein the first charging rate is same as the second charging rate and the second discharging rate is smaller than the first discharging rate, and wherein the control unit sets the second discharging rate in the second scheme at or below 1%/hour of change of state of charge when a negative electrode potential of the battery unit is from 0.1 V to 0.8V.

17. The electronic device according to claim 16, wherein the control unit is also configured to transmit instructions to the charging and discharging circuit to execute discharging of the battery unit.

18. A vehicle comprising:
a battery unit;
a control unit configured to transmit instructions to a charging and discharging circuit to execute charging and discharging of the battery unit, the battery unit is charged and discharged by the charging and discharging circuit according to the instructions; and
a converter configured to convert electric power supplied from the battery to a vehicle driving force,
wherein the control unit is configured to cause a scheme change from a first scheme having a first charging rate and a first discharging rate to a second scheme having a second charging rate and a second discharging rate based on scheme information received by the control unit,
wherein the first charging rate is same as the second charging rate and the second discharging rate is smaller than the first discharging rate, and
wherein the control unit sets the second discharging rate in the second scheme at or below 1%/hour of change of state of charge when a negative electrode potential of the battery unit is from 0.1 V to 0.8V.

19. The vehicle according to claim 18, wherein the control unit is also configured to transmit instructions to the charging and discharging circuit to execute discharging of the battery unit.

20. A control method comprising:
transmitting instructions to a charging and discharging circuit to execute charging and discharging of a battery, the battery is charged and discharged by the charging and discharging circuit according to the instructions,
changing from a first scheme having a first charging rate and a first discharging rate to a second scheme having a second charging rate and a second discharging rate based on scheme information received by a control unit,
wherein the first charging rate is same as the second charging rate and the second discharging rate is smaller than the first discharging rate, and
wherein the control unit sets the second discharging rate in the second scheme at or below 1%/hour of change of state of charge when a negative electrode potential of the battery unit is from 0.1 V to 0.8V.

21. The control method according to claim 20, comprising transmitting instructions to the charging and discharging circuit to execute discharging of the battery.

22. An electric storage system comprising:
a control apparatus including
a control unit configured to transmit instructions to a charging and discharging circuit to execute charging and discharging of a battery, and the battery is charged and discharged by the charging and discharging circuit according to the instructions;
a server connected to the control apparatus,
wherein the control unit is configured to cause a scheme change from a first scheme having a first charging rate and a first discharging rate to a second scheme having a second charging rate and a second discharging rate based on scheme information received by the control unit,
wherein the first charging rate is same as the second charging rate and the second discharging rate is smaller than the first discharging rate, and
wherein the control unit sets the second discharging rate in the second scheme at or below 1%/hour of change of state of charge when a negative electrode potential of the battery is from 0.1 V to 0.8V.

23. The electric storage system according to claim 22, wherein the control apparatus is configured to regulate a usage amount and a generation amount of electric power from an external electronic power supply network.

24. The electric storage system according to claim 22, wherein the server is configured to transmit and receive information from at least one power consumption device that is connected to the control apparatus.

* * * * *